US010663064B2

(12) United States Patent
Aksit

(10) Patent No.: US 10,663,064 B2
(45) Date of Patent: May 26, 2020

(54) BRUSH SEAL ASSEMBLY

(71) Applicant: DOOSAN HEAVY INDUSTRIES & CONSTRUCTION CO., LTD., Changwon-si, Gyeongsangnam-do (KR)

(72) Inventor: Mahmut Faruk Aksit, Istanbul (TR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 127 days.

(21) Appl. No.: 15/969,780

(22) Filed: May 3, 2018

(65) Prior Publication Data
US 2018/0363780 A1 Dec. 20, 2018

(30) Foreign Application Priority Data

Jun. 20, 2017 (KR) .......................... 10-2017-0078146

(51) Int. Cl.
*F16J 15/3288* (2016.01)
*F16J 15/3292* (2016.01)
(Continued)

(52) U.S. Cl.
CPC ....... *F16J 15/3288* (2013.01); *F16J 15/3292* (2013.01); *F01D 11/001* (2013.01);
(Continued)

(58) Field of Classification Search
CPC .......................... F16J 15/3288; F16J 15/3292; F05D 2240/56; F05D 2240/57; F05D 2240/59; F02C 7/28
See application file for complete search history.

(56) References Cited

U.S. PATENT DOCUMENTS 5,799,952 A * 9/1998 Morrison ............. F16J 15/3288
277/355
6,173,962 B1 * 1/2001 Morrison ............. F16J 15/3288
277/355
(Continued)

FOREIGN PATENT DOCUMENTS

CN 1590711 A 3/2005
JP H0755018 A 3/1995
(Continued)

OTHER PUBLICATIONS

A Japanese Notification of Reasons for Refusal dated Mar. 14, 2019 in connection with Japanese Patent Application No. 2018-028145 which corresponds to the above-referenced U.S. application.
(Continued)

*Primary Examiner* — Nicholas L Foster
(74) *Attorney, Agent, or Firm* — Invenstone Patent, LLC

(57) ABSTRACT

A brush seal assembly includes a brush seal, a brush support portion, and an assembly support portion. The brush seal, which has a multitude of bristles forming an angle with respect to a radial direction of a rotating body rotated inside a casing, is disposed around an outer circumferential surface of the rotating body and is oriented with respect to the body's rotating direction. The brush support portion supports the brush seal by extending toward the rotating body while contacting a low-pressure side of the brush seal. The assembly support portion supports the brush seal and the brush support portion and to receive respectively a base end of the brush seal and an axial protrusion of the brush support portion. The brush support portion contacts the brush seal along a predetermined length, which is greater than that of a line following a bristle of the brush seal.

18 Claims, 14 Drawing Sheets

(51) Int. Cl.
　　　*F01D 11/00* 　　(2006.01)
　　　*F01D 11/02* 　　(2006.01)

(52) U.S. Cl.
　　　CPC .......... *F01D 11/02* (2013.01); *F05D 2220/31* (2013.01); *F05D 2220/32* (2013.01); *F05D 2240/56* (2013.01); *F05D 2240/57* (2013.01); *F05D 2240/59* (2013.01)

(56) References Cited

U.S. PATENT DOCUMENTS

| | | | | |
|---|---|---|---|---|
| 6,267,381 | B1 * | 7/2001 | Wright | F16J 15/3292 |
| | | | | 277/355 |
| 6,331,006 | B1 | 12/2001 | Baily et al. | |
| 6,840,518 | B2 | 1/2005 | Boston | |
| 6,874,787 | B2 * | 4/2005 | Kono | F16J 15/3288 |
| | | | | 277/355 |
| 7,445,212 | B2 | 11/2008 | Gail et al. | |
| 9,046,179 | B2 * | 6/2015 | Uehara | F01D 11/001 |
| 9,841,109 | B2 * | 12/2017 | Uehara | F01D 11/025 |
| 10,190,433 | B2 * | 1/2019 | Ozaki | F16J 15/22 |
| 2002/0140174 | A1 * | 10/2002 | Kono | F16J 15/3288 |
| | | | | 277/355 |
| 2003/0006559 | A1 | 1/2003 | Inoue | |
| 2008/0284107 | A1 * | 11/2008 | Flaherty | C04B 35/10 |
| | | | | 277/355 |
| 2009/0072486 | A1 * | 3/2009 | Datta | F16J 15/3288 |
| | | | | 277/355 |
| 2013/0069316 | A1 * | 3/2013 | Uehara | F01D 11/001 |
| | | | | 277/352 |
| 2013/0154195 | A1 * | 6/2013 | Uehara | F01D 11/025 |
| | | | | 277/418 |
| 2016/0334020 | A1 | 11/2016 | Ozaki et al. | |

FOREIGN PATENT DOCUMENTS

| | | |
|---|---|---|
| JP | H11513781 A | 11/1999 |
| KR | 100659414 B1 | 12/2006 |
| KR | 101472652 B1 | 12/2014 |
| KR | 101633546 B1 | 6/2016 |

OTHER PUBLICATIONS

An European Search Report dated Nov. 28, 2018 in connection with European Patent Application No. 18176171.9 which corresponds to the above-referenced U.S. application.

* cited by examiner

[FIG. 1]
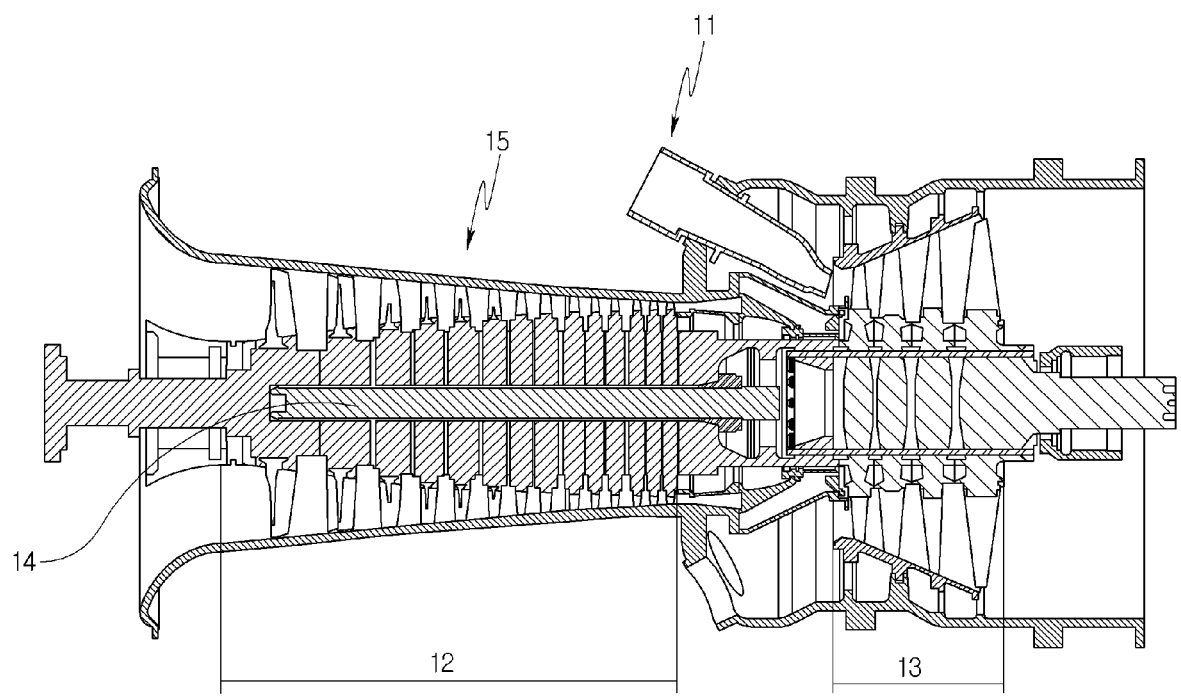

[FIG. 2]
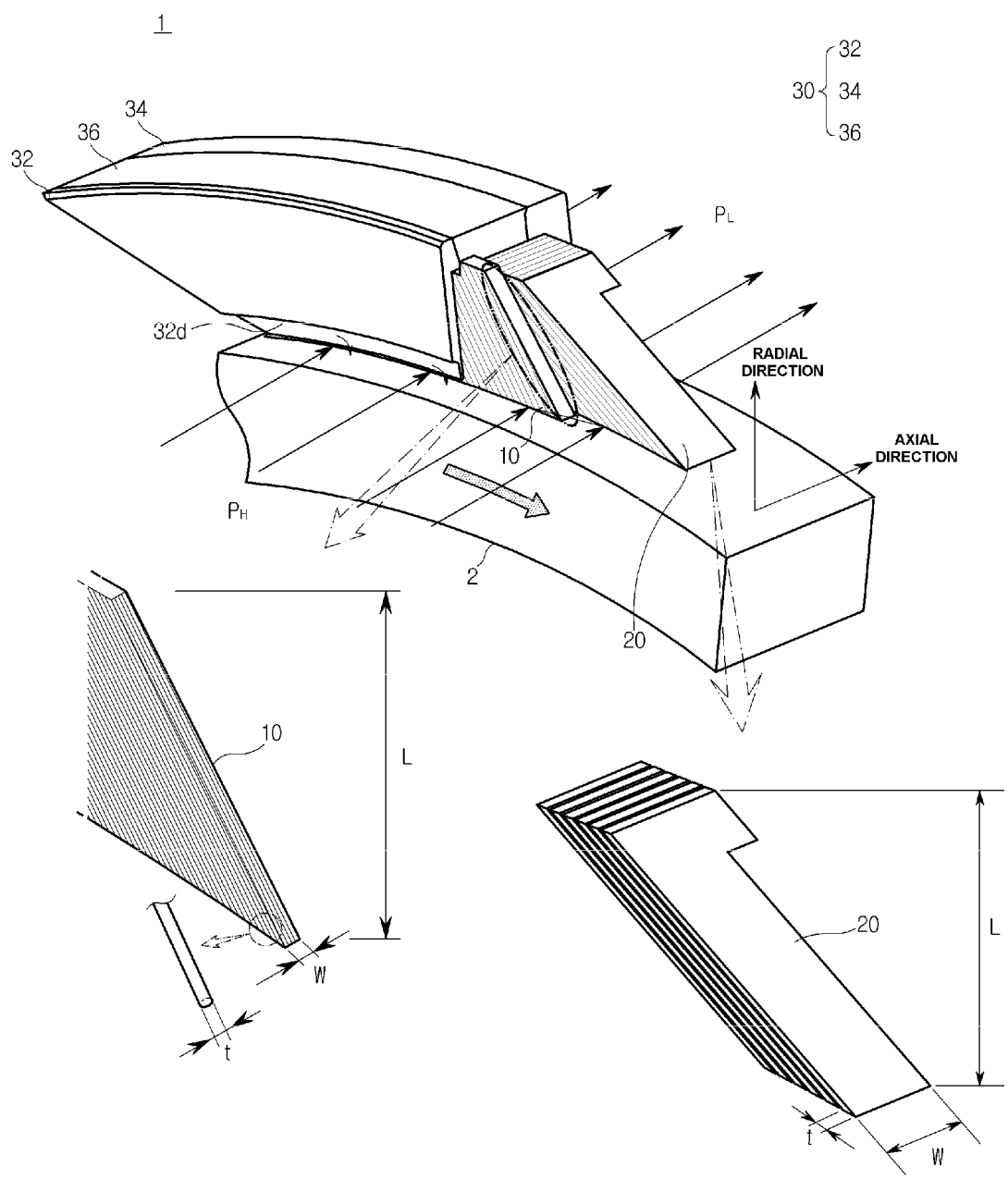

[FIG. 3]
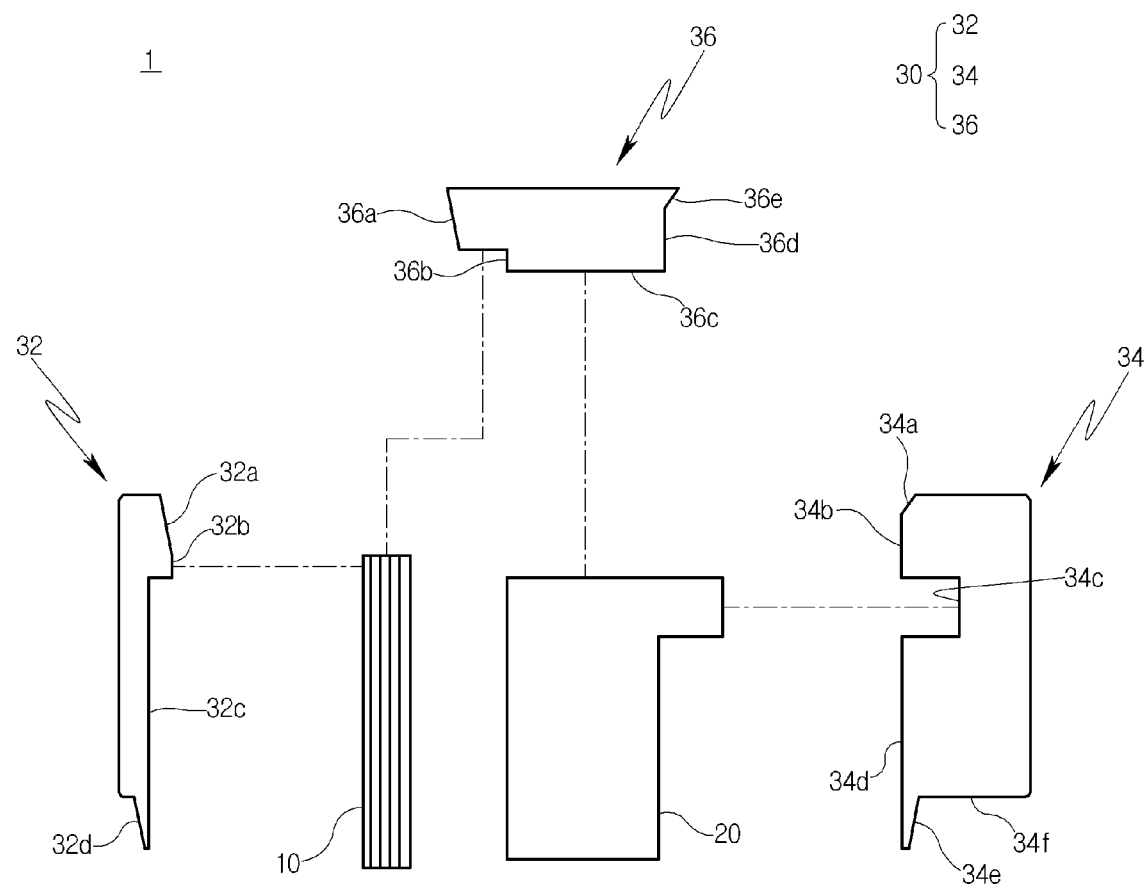

[FIG. 4]
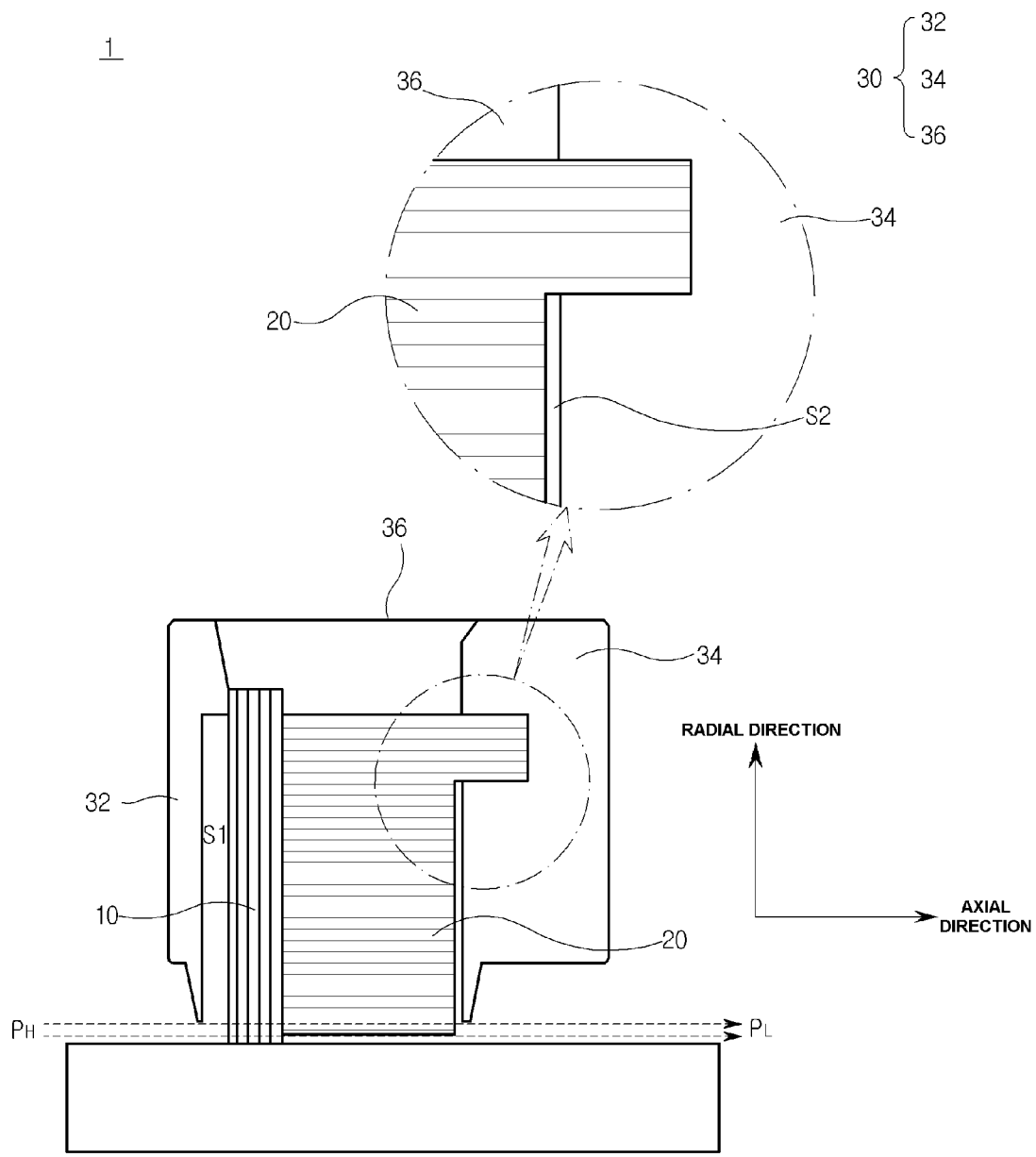

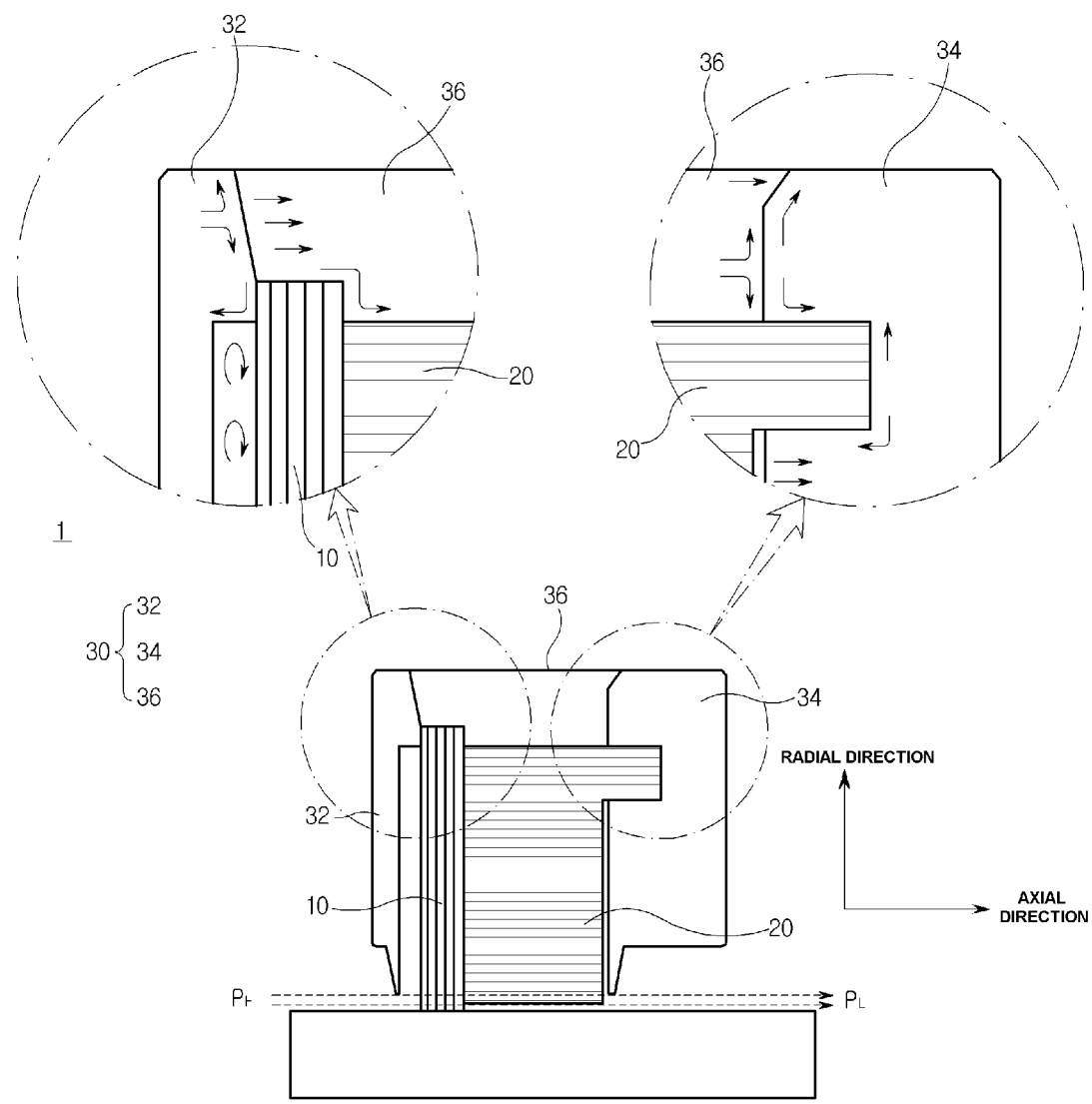
[FIG.5]

[FIG. 6]
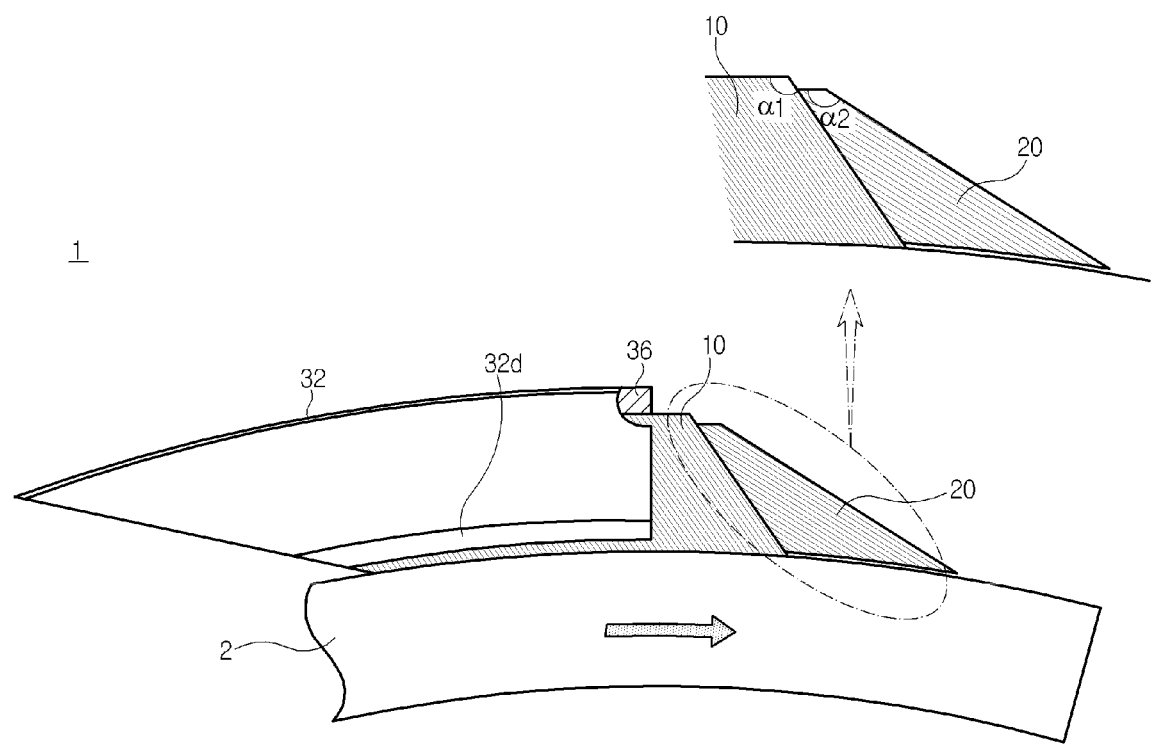

[FIG. 7]
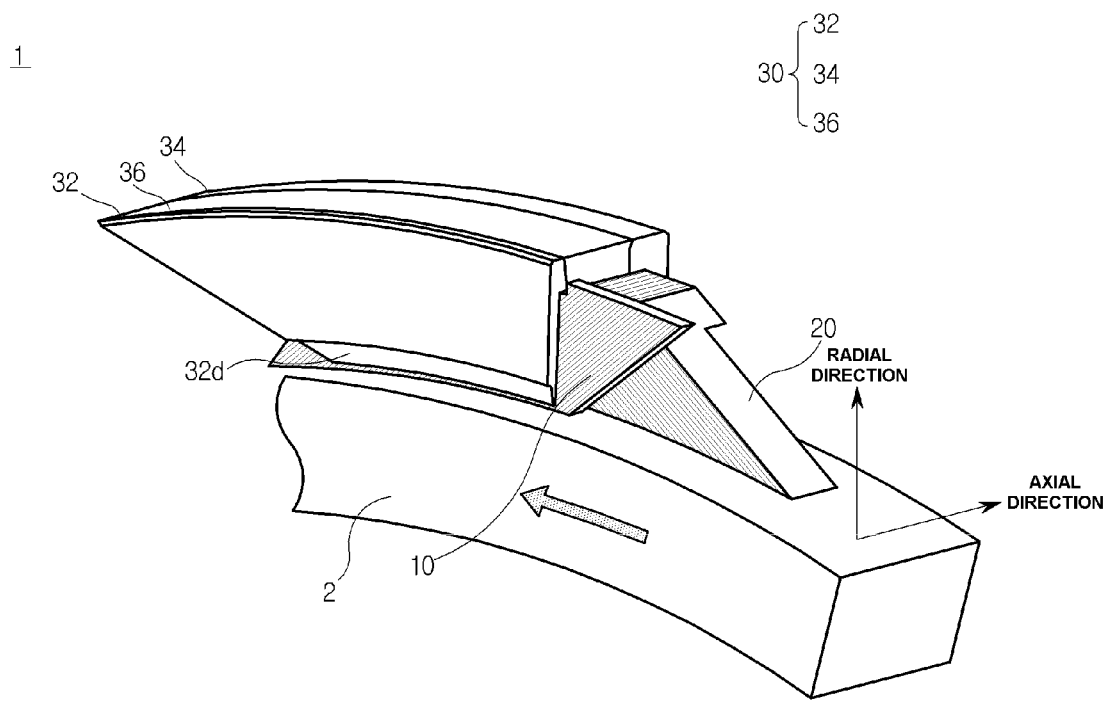

[FIG. 8]
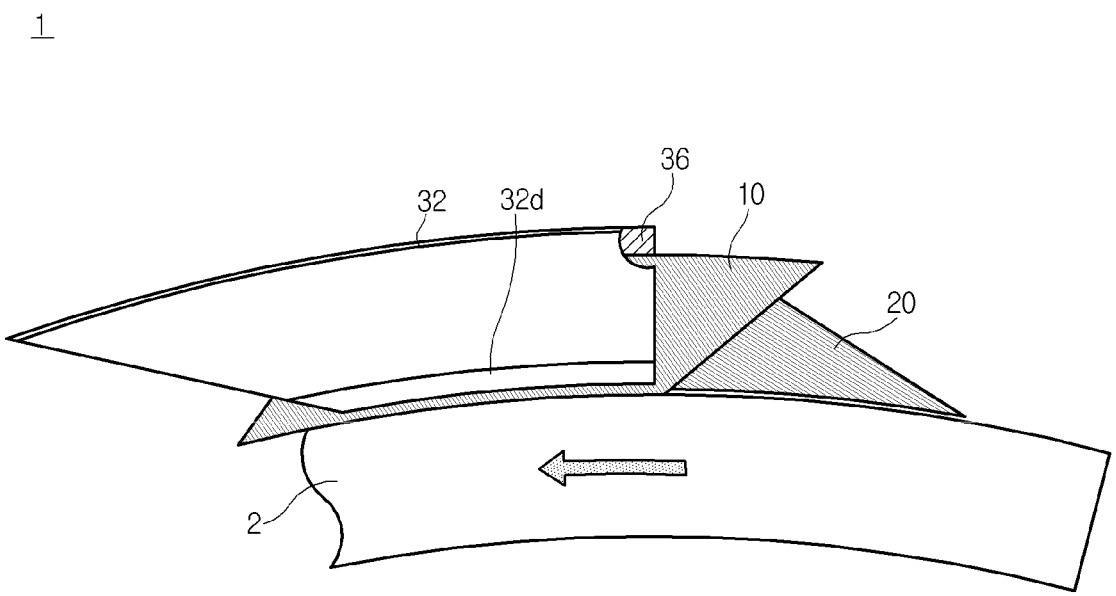

[FIG. 9]
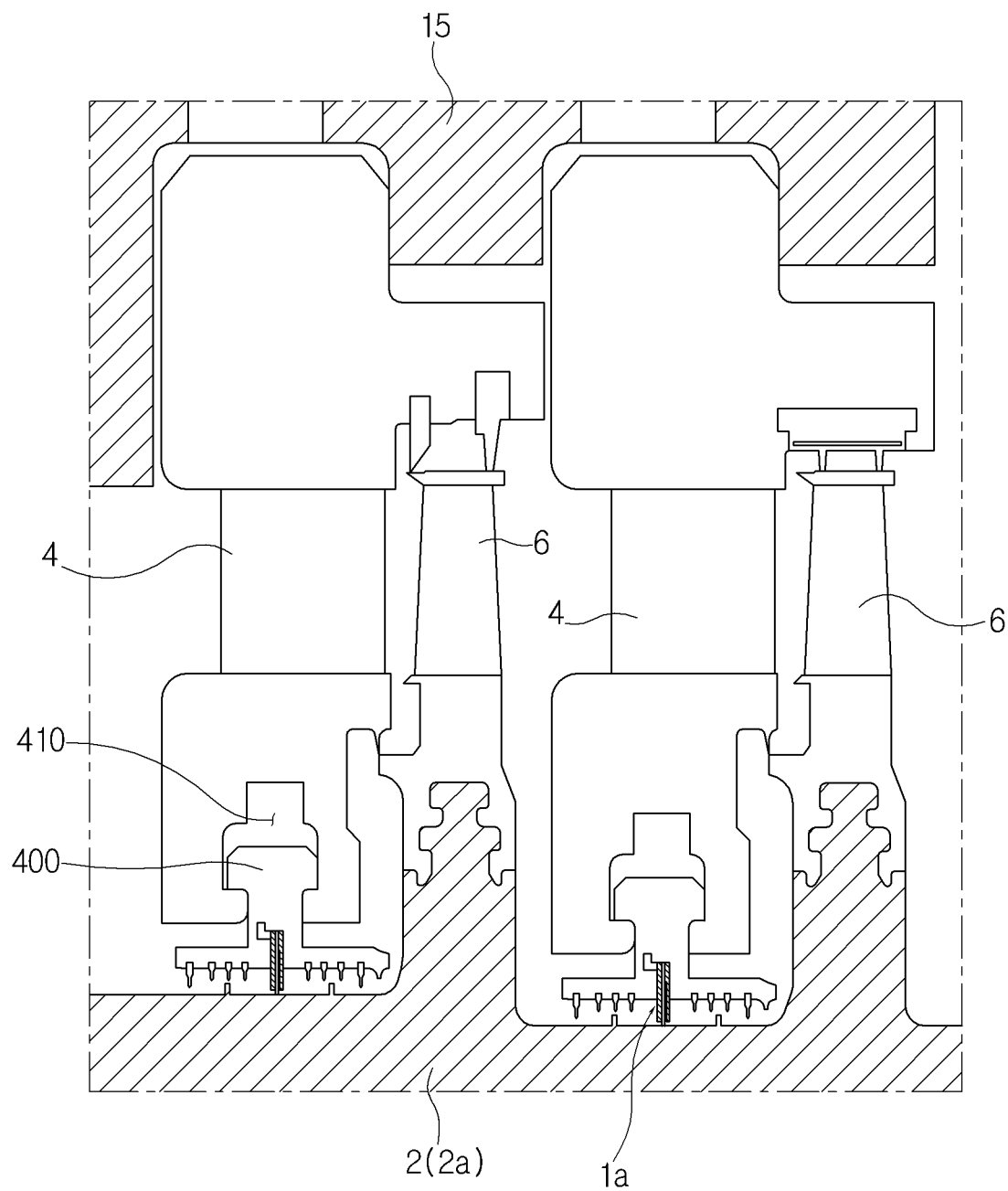

[FIG. 10]
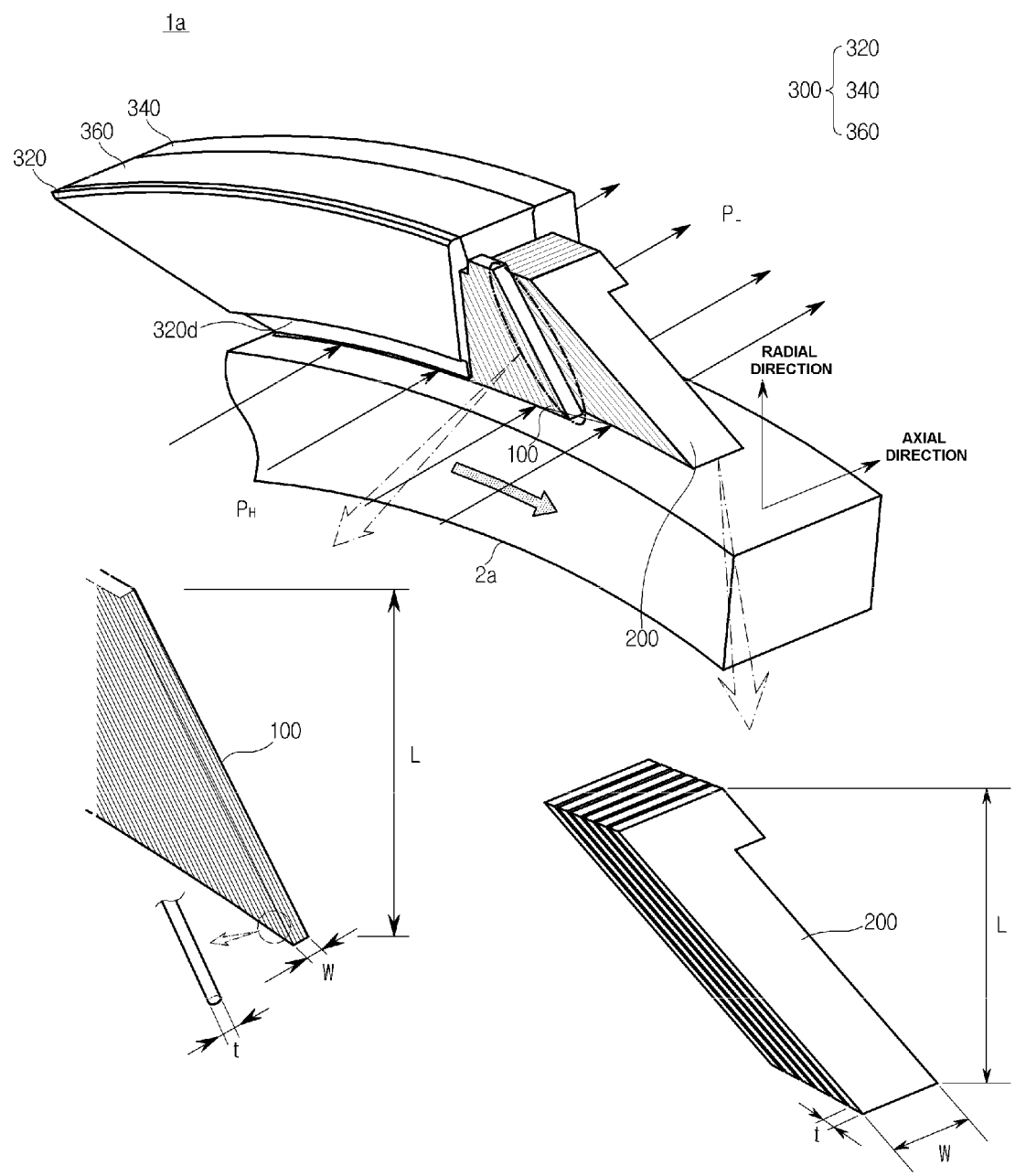

[FIG. 11]
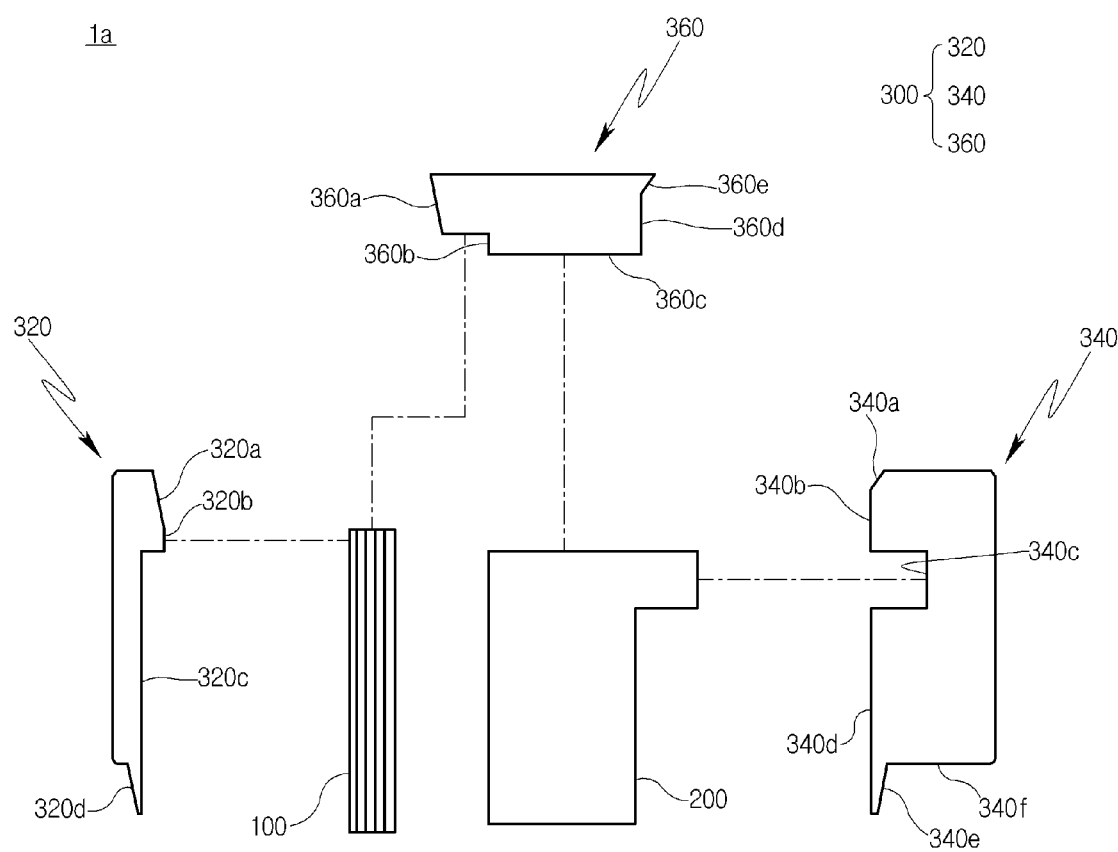

[FIG. 12]
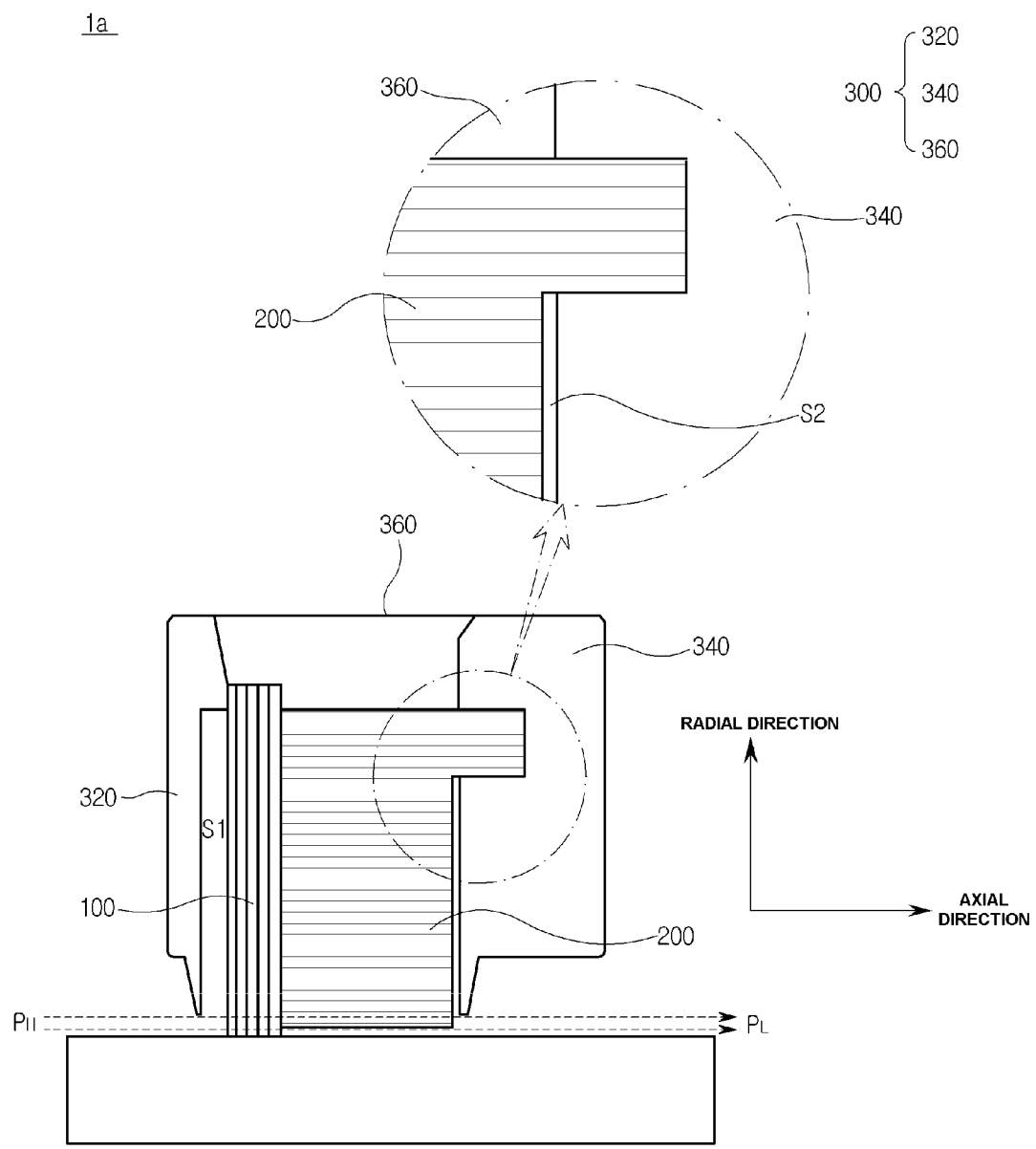

[FIG.13]
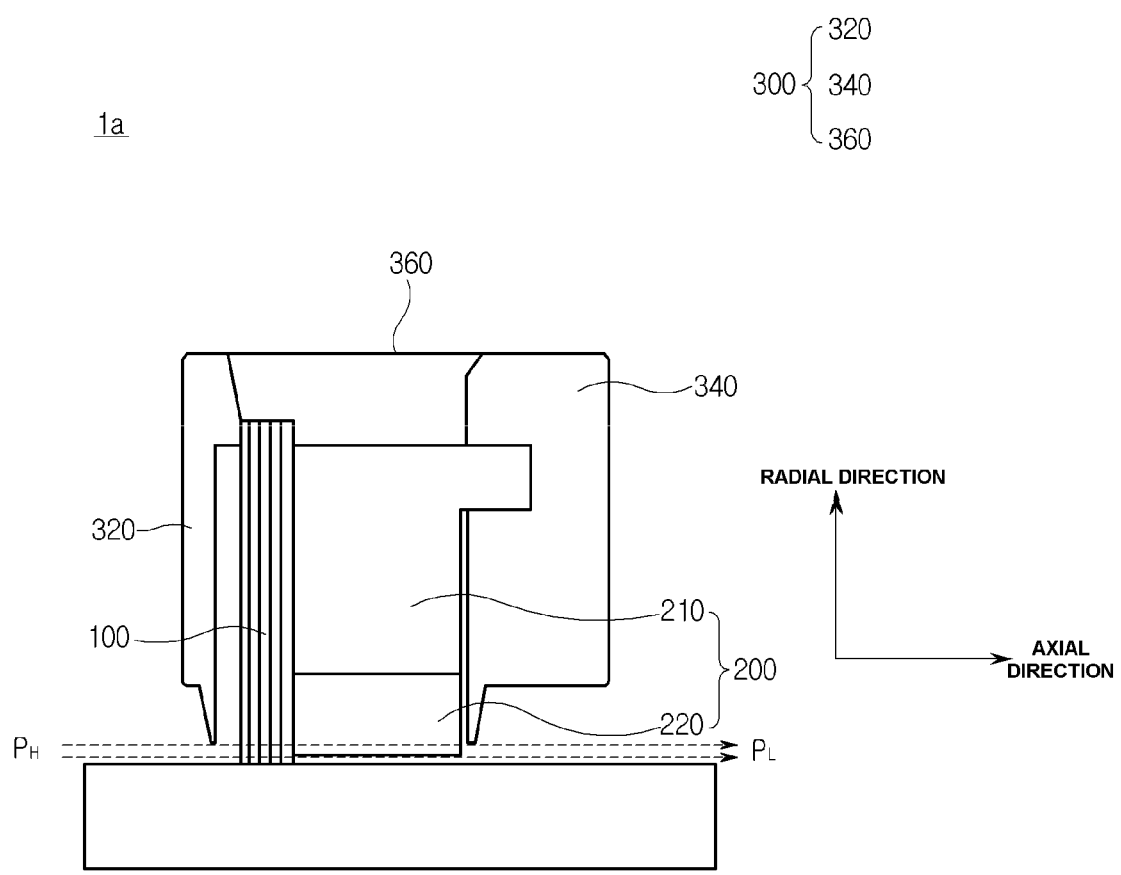

[FIG. 14]
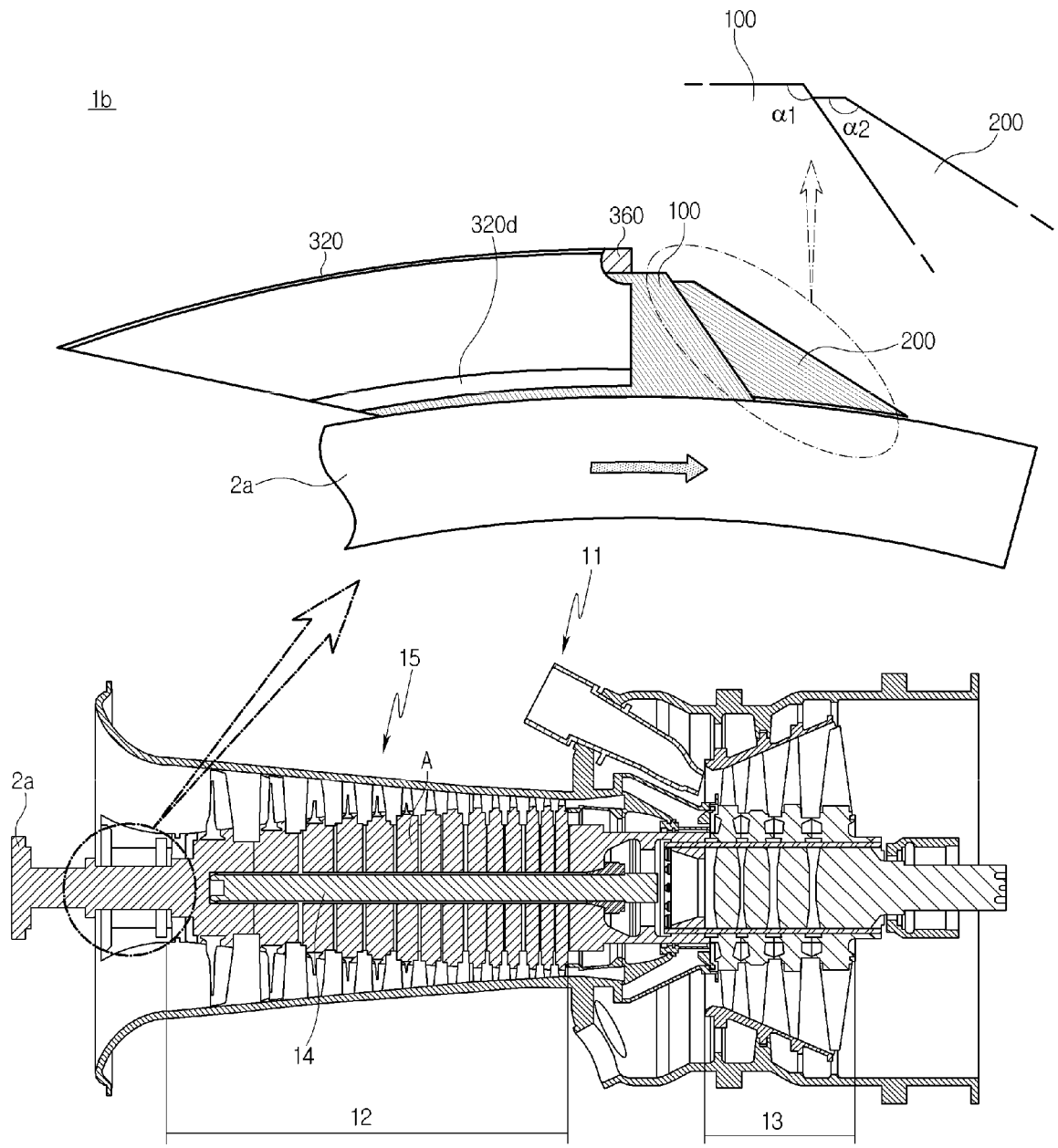

BRUSH SEAL ASSEMBLY

CROSS-REFERENCE TO RELATED APPLICATION

This application claims priority to Korean Patent Application No. 10-2017-0078146, filed on Jun. 20, 2017, the disclosure of which is incorporated herein by reference in its entirety.

BACKGROUND OF THE INVENTION

Field of the Invention

Exemplary embodiments of the present invention relate to a brush seal assembly, and more particularly, to a brush seal assembly for preventing a deformation of a brush seal caused by friction and stress forces applied to the brush seal.

Description of the Related Art

Generally, a turbine is a power generation apparatus which converts heat energy of fluids such as gas or steam into a torque, which is mechanical energy, and includes a rotor and a casing. The rotor may be provided with a plurality of buckets to be shaft-rotated by the fluid, and the casing is installed around the rotor's circumference and may be provided with a plurality of diaphragms.

Among turbines, a gas turbine is configured to include a compressor, a combustor, and a turbine, and sucks and compresses external air by a rotation of the compressor and then supplies the compressed air to the combustor. The combustor mixes compressed air with fuel to perform combustion. High-pressure, high-temperature gas from the combustor passes through the turbine and rotates the rotor to drive a generator.

In a steam turbine, a high-pressure turbine, an intermediate-pressure turbine, and a low-pressure turbine are connected in series or in parallel to rotate the rotor. In the case of a series connection, the three turbines share one rotor. Each turbine of a steam turbine includes the diaphragms of the casing and the buckets of the rotor, and steam passing through the diaphragms and the buckets rotates the rotor to drive the generator.

The gas turbine and the steam turbine have a structure in which the rotating body (buckets) is rotated with respect to the fixed body (diaphragms). Therefore, due to a gap existing between the fixed body and the rotating body, the high-pressure fluid tends to leak through the gap, which would cause a power loss and thus degrade energy efficiency. There are ongoing efforts to reduce this leakage. Foremost in these efforts is to minimize the gap between the rotating body and the fixed body.

However, as a practical matter, there are limitations in narrowing the gap. For example, if the gap is excessively narrow, the rotating body and the fixed body may interfere with each other when the rotating body is shaft-rotated. The interference, or rubbing, generates vibrations which can seriously damage the turbine. The potential for interference exists under normal conditions of being operated, including starting and stopping, whereby a steam turbine expands and contracts from several millimeters to several tens of millimeters depending on the point of measurement, because high-temperature steam introduced from a boiler applies heat throughout the rotating body and the fixed body. Not only does the expansion coefficient differ according to the characteristics of the various materials constituting the rotating body and the fixed body, but the directionality of the expansion also differs depending on the structure of the turbine.

Conventionally, sealing the gap between the fixed body and the rotating body is achieved by applying a labyrinth seal. Recent developments include technologies for applying a brush seal formed by coupling a brush to a labyrinth seal to close the gap, thereby sealing the fixed body and the rotating body through a smooth contact between the respective bodies.

SUMMARY OF THE INVENTION

An object of the present invention is to improve a stable operation and an output of a gas turbine by improving sealing safety of a rotating body and a brush seal assembly surrounding the rotating body.

An object of the present invention is to improve sealing safety of a brush seal assembly surrounding a rotor of a gas turbine and minimize problems due to a deformation and a stress concentration of components configuring the brush seal assembly.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a brush seal assembly includes: a brush seal 10 which is located to surround an outer circumferential surface of a rotating body 2 rotated inside a casing 15 and inclinedly extends toward the rotating body 2; a brush support portion 20 which is in close contact with the brush seal 10 to support the brush seal 10 and inclinedly extends with respect to the rotating body 2; and an assembly support portion 30 which surrounds and supports the brush seal 10 and the brush support portion 20 in a state in which the brush seal 10 and the brush support portion 20 are partially inserted.

The assembly support portion 30 may include: a first support 32 which partially contacts a side surface of the brush seal 10; a second support 34 which supports the other side of the brush support portion 20 which is an opposite side in close contact with the brush seal 10; and a third support 36 which is located between the first support 32 and the second support 34 and supports the brush seal 10 and the brush support portion 20 at the same time.

The first sup brush base contacting edge port 32 may include: a first inclined surface 32a which is formed in a section in close contact with the third support 36; a brush base contacting edge 32b which extends to partially contact the brush seal 10 at an end part of the first inclined surface 32a extending toward the rotating body 2; and a first fluid space surface 32c which extends from an extending end part of the brush base contacting edge 32b toward an outside of the brush seal 10 and has an end part vertically bent toward the rotating body 2, and the first inclined surface 32a may be inclined toward a front of the brush seal 10.

The first support 32 may have a front surface provided with a first fluid guide 32d inclined toward the rotating body 2 to guide a high pressure fluid introduced into the brush seal 10 to an end part of the brush seal 10 adjacent to the rotating body 2.

The third support 36 may include: a third inclined surface 36a which faces the first inclined surface 32a and contacts the first inclined surface 32a at a length corresponding to that of the first inclined surface 32a; a brush base groove 36b which is bent at the extending end part of the third inclined surface 36a toward the brush seal 10 while surrounding the outside of the brush seal 10; a fourth extending portion 36c which extends in an axial direction of the rotating body 2 while surface-contacting an outside of the brush support portion 20 at the bent end part of the brush base groove 36b; a vertical surface 36d which extends from the extending end part of the fourth extending portion 36c toward an radial outside of the brush support portion 20; and a fourth inclined surface 36e which is inclined in one side direction from the extending end part of the vertical surface 36d toward the radial outside, and the brush base contacting edge 32b and the brush base groove 36b may face each other and extend at the same length, and the fourth extending portion 36c may surface-contact the brush support portion 20 at a length of ⅔L or more when the entire length in the axial direction of the brush support portion 20 is L.

The second support 34 may include: a second inclined surface 34a which is partially in close contact with third support 36 while being inclined with respect to the third support 36; a vertical edge 34b which extends from the extending end part of the second inclined surface 34a toward the brush support portion 20; a protrusion groove 34c into which the brush support portion 20 is partially inserted at the end part of the vertical edge 34b; and a second fluid space surface 34d which faces the brush support portion 20 at the protrusion groove 34c and extends toward the rotating body 2.

The second support 34 may include: a second fluid guide 34e which is inclined upward from the extending end part of the second fluid space surface 34d so that the fluid passing through the brush support portion 20 passes through the second support 34 at a shortest distance to move in the axial direction of the rotating body 2; and a extending portion 34f which extends by a predetermined length in the axial direction of the rotating body 2 from the inclined end part of the second fluid guide 34e, and the extending portion 34f may extend to be longer than a length of the protrusion groove 34c extending in the axial direction.

The protrusion groove 34c may be formed in the axial direction of the rotating body 2, and the brush support portion 20 may be inserted into the protrusion groove 34c to be in close contact with the protrusion groove 34c.

The brush seal 10 may inclinedly extend toward the rotating body 2 at a first inclination angle α1, the brush support portion 20 may be inclined toward the rotating body 2 at a second inclination angle α2, and the second inclination angle α2 may be larger than the first inclination angle α1, and the brush seal 10 may be in contact with the outer circumferential surface of the rotating body 2, and the brush support portion 20 may be spaced apart from the outer circumferential surface of the rotating body 2.

The brush support portion 20 may have a plate shape having a predetermined thickness, width, and length.

A first fluid space S1 may be formed between the brush seal 10 and the first support 32 facing the brush seal 100, and a second fluid space S2 may be formed between the brush support portion 20 and the second support 34 facing the brush support portion 200.

In accordance with one aspect of the present invention, a brush seal assembly includes: a brush seal 100 which is located to surround an outer circumferential surface of a rotor 2a rotated inside a casing 15 of a turbine and inclinedly extends toward the rotor 2a; a brush support portion 200 which is in close contact with the brush seal 100, supports the brush seal 100, and inclinedly extends with respect to the rotor 2a; and an assembly support portion 300 which supports the brush seal 100 and the brush support portion 200, wherein the brush support portion 200 may extend so that a length extending toward the rotor 2a is longer than a length extending toward the brush seal 100.

The assembly support portion 300 may include: a first support 320 which partially contacts a side surface of the brush seal 100; a second support 340 which supports the other side of the brush support portion 200 which is an opposite side in close contact with the brush seal 100; and a third support 360 which is located between the first support 320 and the second support 340 and supports the brush seal 100 and the brush support portion 200 at the same time.

The first support 320 may include: a first inclined surface 320a which is formed in a section in close contact with the third support 360; a brush base contacting edge 320b which extends to partially contact the brush seal 100 at an end part of the first inclined surface 320a extending toward the rotor 2a; and a first fluid space surface 320c which extends from an extending end part of the brush base contacting edge 320b toward an outside of the brush seal 100 and has an end part vertically bent toward the rotor 2a, and the first inclined surface 320a is inclined toward a front of the brush seal 100, and the first support 320 has a front surface provided with a first fluid guide 320d which is inclined toward the rotor 2a to guide the high pressure fluid introduced into the brush seal 100 to the end part of the brush seal 100 adjacent to the rotor 2a.

A first fluid space S1 may be formed between the brush seal 100 and the first support 320 facing the brush seal 100, and a second fluid space S2 may be formed between the brush support portion 200 and the second support 340 facing the brush support portion 200.

The third support 360 may include: a third inclined surface 360a which faces the first inclined surface 320a and contacts the first inclined surface 320a at a length corresponding to that of the first inclined surface 320a; a brush base groove 360b which is bent at the extending end part of the third inclined surface 360a toward the brush seal 100 while surrounding the outside of the brush seal 100; a fourth extending portion 360c which extends in an axial direction of the rotor 2a while surface-contacting an outside of the brush support portion 200 at a bent end part of the brush base groove 360b; a vertical surface 360d which extends from the extending end part of the fourth extending portion 360c toward an radial outside of the brush support portion 200; and a fourth inclined surface 360e which is inclined in one side direction from the extending end part of the vertical surface 360d toward the radial outside, and the brush base contacting edge 320b and the brush base groove 360b may face each other and extend at the same length, and the fourth extending portion 360c may surface-contact the brush support portion 200 at a length of ⅔ L or more when the entire length in the axial direction of the brush support portion 200 is L.

The second support 340 may include: a second inclined surface 340a which is partially in close contact with third support 360 while being inclined with respect to the third support 360; a vertical edge 340b which extends from the extending end part of the second inclined surface 340a toward the brush support portion 200; a protrusion groove 340c into which the brush support portion 200 is partially inserted at the end part of the vertical edge 340b; and a second fluid space surface 340d which faces the brush support portion 200 at the protrusion groove 340c and extends toward the rotor 2a.

The second support 340 may include: a second fluid guide 340e which is inclined upward from the extending end part of the second fluid space surface 340d so that the fluid passing through the brush support portion 200 passes through the second support 340 at a shortest distance to move in the axial direction of the rotor 2a; and a extending portion 340f which extends by a predetermined length in the axial direction of the rotor 2a from the inclined end part of the second fluid guide 340e, and the second support 340 may extend so that a length extending in the axial direction of the rotor 2a is longer than the first support 320.

The brush seal 100 may inclinedly extend toward the rotor 2a at a first inclination angle $\alpha 1$, the brush support portion 200 may be inclined toward the rotor 2a at a second inclination angle $\alpha 2$, and the second inclination angle $\alpha 2$ may be larger than the first inclination angle $\alpha 1$, and the brush support portion 200 may have a plate shape having a predetermined thickness, width, and length.

The brush support portion 200 may be made of a material having a different thermal expansion rate in the radial direction of the rotor 2a.

The brush support portion 200 may include: a first brush support 210 which extends by a first length L1 from the assembly support portion 300 toward the rotor 2a and has a first thermal expansion rate; and a second brush support 220 which extends by a second length L2 from the end part of the first brush support 210 extending toward the rotor 2a toward the outer circumferential surface of the rotor 2a and has a second thermal expansion rate, and the second brush support 220 may be configured to have a thermal expansion rate smaller than that of the first brush support 210, and the brush support portion 200 may have a thickness reduced from the casing 15 toward the rotor 2a.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a cross-sectional view illustrating a gas turbine according to an embodiment of the present invention;

FIG. 2 is a perspective view illustrating a brush seal assembly according to the embodiment of the present invention;

FIG. 3 is an exploded view of the brush seal assembly according to the embodiment of the present invention;

FIG. 4 is a front view of the brush seal assembly according to the embodiment of the present invention;

FIG. 5 is a front view of the brush seal assembly according to the embodiment of the present invention, illustrating a state in which a fluid pressure applied to the brush seal assembly is check supported and dispersed constrain dissipate;

FIG. 6 is a side view of the brush seal assembly according to the embodiment of the present invention;

FIGS. 7 and 8 are views of a brush seal assembly according to another embodiment of the present invention, illustrating a brush seal configuration in which the directionality of a rotating body is reversed;

FIG. 9 is a cross-sectional view illustrating a state in which the brush seal assembly according to the embodiment of the present invention is located inside a casing;

FIG. 10 is a perspective view illustrating the brush seal assembly according to another embodiment of the present invention;

FIG. 11 is an exploded view of the brush seal assembly according to another embodiment of the present invention;

FIG. 12 is a front view of the brush seal assembly according to another embodiment of the present invention;

FIG. 13 is a front view of the brush seal assembly according to another embodiment of the present invention; and FIG. 14 is a diagram illustrating a state in which the brush seal assembly of the present invention is applied to a gas turbine

DESCRIPTION OF SPECIFIC EMBODIMENTS

A description will be given of a basic configuration of a gas turbine in which a brush seal assembly is installed, before a description of the brush seal assembly according to an embodiment of the present invention. That is, main components of the gas turbine provided with the brush seal assembly according to the present embodiment will first be described with reference to FIG. 1.

The gas turbine is provided with a casing 15 which forms an outer appearance. A rear side of the casing 15 is provided with a diffuser to which combustion gas passing through the turbine is discharged. A front side of the diffuser is provided with a combustor 11, which introduces compressed air to a front side of the turbine and combusts the compressed air.

In terms of airflow direction, a compressor section 12 is located upstream of the casing 15, and a turbine section 13 is located downstream thereof.

A torque tube 14 is provided as a torque transmission member, between the compressor section 12 and the turbine section 13, and transmits a rotational torque generated from the turbine section 13 to the compressor section.

The compressor section 12 is provided with a plurality (e.g., fourteen) of compressor rotor disks. The respective compressor rotor disks are fastened to each other by a tie rod to hold the disks close together in an axial direction. The tie rod passes through the center of each compressor rotor disk such that the compressor rotor disks are axially aligned. One end of the tie rod is fastened to the compressor rotor disk disposed at an uppermost location, and its other end is fixed to the torque tube.

The tie rod may be variously configured according to the gas turbine and is not limited to the shape illustrated in FIG. 1. For example, one tie rod may pass through the central part of the rotor disk or a plurality of tie rods may be disposed circumferentially, or a combination of these may be employed.

A flange is provided around an outer circumferential part of the compressor rotor disk and protrudes in the axial direction. The flange is engaged to prevent relative rotation between adjacent rotor disks.

A plurality of blades are radially coupled to the outer circumferential surface of the compressor rotor disk. Each blade is provided with a dovetail portion and is fastened to the compressor rotor disk.

As a fastening type of the dovetail portion, there are a tangential type and an axial type. The type may be selected according to the required structure of the commercialized gas turbine. In some cases, the blades may be fastened to the rotor disk using fastening devices other than the dovetail.

Although not illustrated, the compressor of the gas turbine may be provided with a vane, called a deswirler, serving as a guide vane next to the diffuser. The guide vane increases the pressure of a fluid and then adjusts a flow angle of the fluid entering an inlet of the combustor to a design flow angle.

The combustor 11 mixes the introduced compressed air with fuel and combusts the mixture to produce high-energy, high-temperature, high-pressure combusted gas. The combusted gas temperature is increased to a temperature at which the combustor and heat-resistant parts of the turbine may withstand during a burn-down process.

A plurality of combustors configuring the combustion system of the gas turbine may be arranged in the casing formed in a cell shape or a shell shape. The combustor is configured to include a burner which includes a fuel injection nozzle and the like, a combustor liner which forms a combustion chamber, and a transition piece which is a connecting portion between the combustor and the turbine section.

Specifically, the liner provides a combustion space in which fuel injected from a fuel nozzle is mixed with the compressed air of the compressor and combusted. Such a liner may include a flame container forming the combustion space and a flow sleeve forming an annular space while surrounding the flame container. The fuel nozzle is joined to a front end of the liner, and an ignition plug is joined to a side wall thereof.

Meanwhile, the transition piece is connected to a rear end of the liner so that the gas combusted by the ignition plug may be transmitted to the turbine side. An outer wall of the transition piece is cooled by the compressed air supplied from the compressor, to prevent the transition piece from being damaged by the high temperature of the combusted gas. To this end, the transition piece is provided with cooling holes through which air may be injected, and the compressed air flows through the holes and into the liner side after cooling a main body existing therein.

The air cooling the foregoing transition piece flows into the annular space of the liner. The air compressed outside the flow sleeve may be provided as the cooling air through the cooling holes provided on the flow sleeve and thus collide with the outer wall of the liner.

On the other hand, generally, in the turbine, the high-temperature and high-pressure combustion gas from the combustor gives a collision and reaction force to a rotating blade of the turbine while being expanded and converts the force into mechanical energy. The mechanical energy obtained from the turbine is supplied as energy required to compress air in the compressor and the remainder is used to drive the generator to produce power.

In the turbine, a plurality of stationary blades and dynamic blades are alternately disposed in a vehicle room, and the dynamic blades are driven by the combusted gas to rotate and drive the output shaft to which the generator is connected. To this end, the turbine section 13 is provided with a plurality of turbine rotor disks. Each of the turbine rotor disks has the same basic shape to the compressor rotor disk. Thus, the turbine rotor disk also includes a flange, which engages with neighboring turbine rotor disks, and a plurality of turbine blades which are disposed radially. The turbine blade may also be joined to the turbine rotor disk in a dovetail scheme.

In the gas turbine having the structure as described above, the introduced air is compressed by the compressor section 12, combusted by the combustor 11, and then delivered to the turbine section 13 to drive the turbine and is discharged into the atmosphere through the diffuser.

Hereinafter, the state in which the brush seal assembly is installed on the rotating body will be described with reference to the drawings.

Referring to FIGS. 1 to 6, the brush seal assembly 1 according to the present embodiment includes a brush seal 10, a brush support portion 20, and an assembly support portion 30. The brush seal 10 is located to surround the outer circumferential surface of a rotating body 2 rotated inside the casing 15 and inclinedly extends toward the rotating body 2. The brush support portion 20 is in close contact with the brush seal 10 to support the brush seal 10 and inclinedly extends with respect to the rotating body 2. The assembly support portion 30 surrounds and supports the brush seal 10 and the brush support portion 20 in a state in which the brush seal 10 and the brush support portion 20 are partially inserted.

The rotating body 2 extends a predetermined length from a center of the interior of the casing 15 and is provided with a plurality of components along the axial direction of the rotating body 2. The casing 15 is assembled from two halves each having a semi-cylindrical shape in general and facing the other half. One semi-cylinder is arranged as the lower side of the casing 15, and the other semi-cylinder is arranged as the upper side of the casing 15. The rotating body 2 may be provided in, for example, a turbo device, but is not limited thereto.

In the present embodiment, the disposition of the brush seal 10 with respect to the rotating body 2 is shown in the drawings, and the rotating body 2 is rotated at a predetermined speed in the arrow direction.

In the present embodiment, a high pressure state (PH) and a low pressure state (PL) are maintained on opposite sides of the brush seal assembly 1. That is, when the high pressure fluid moves along the axial direction of the rotating body 2, the fluid moves through the brush seal 10 and the brush support portion 20 to minimally maintain the leakage of the fluid occurring through the gap between the brush seal assembly 1 and the rotating body 2, thereby reducing the unnecessary power loss and preventing the reduction in the energy efficiency.

According to the present embodiment, sealing is achieved by the brush seal 10 and the brush support portion 20. The brush seal 10 and the brush support portion 20 each extend toward the rotating body 2 at different angles.

For example, the brush seal 10 is disposed to be inclined in the rotating direction of the rotating body 2. The reason for inclining the brush seal 10 is to prevent the brush seal 10 from becoming interposed into the spacing of the brush support portion 20.

That is, friction between the rotating body 2 and the brush seal 10 occurs while the rotating body 2 is rotated in the arrow direction, and the brush seal 10 is applied with a pressing force in the radial direction of the rotating body 2.

The pressing force may induce a deformation due to a continuous friction and stress concentration on the brush seal 10, and may induce the unstable sealing of the fluid passing through the brush seal assembly 1.

According to the present embodiment, when the fluid passes through the brush seal assembly 1, the friction and stress concentration applied to the brush seal 10 may be minimized by the brush support portion 20 to be described below, thereby preventing the deformation of the brush seal 10, more improving the sealing effect, and minimizing the unnecessary vibration.

Describing in detail this, the fluid moves the arrow direction along the axial direction of the rotating body 2, and the high pressure fluid is supplied to the brush seal 10. The brush seal 10 is held in contact with the outer circumferential surface of the rotating body 2, and when the rotating body 2 is rotated in the arrow direction (clockwise), the brush seal 10 is pressed in the radial direction of the rotating body 2.

Since the brush seal 10 is made of a flexible material, when the rotating body 2 is rotated under the condition that it is in contact with the rotating body 2, the brush seal 10 is bent in the radial direction and is bent toward the brush support portion 20 by the pressure of the fluid.

At this time, the brush seal 10 may not be excessively bent in the radial direction of the rotating body 2 and maintain a certain gap from the rotating body 2 while the brush seal 10 is in contact with the brush support portion 20.

The brush seal 10 according to the present embodiment may be configured to have any one diameter selected from 0.2 mm to 0.26 mm in diameter. Preferably, the length may be any one length selected from 20 mm to 23 mm.

According to the embodiment of the present invention, when the brush seal 10 extends by the foregoing length and diameter, the brush seal 10 may have the lower stress concentration and wear than those of the existing brush seal having the relatively larger diameter and minimize even the irregular wear amount according to the location, as compared with the high temperature condition and the condition that the friction with the rotating body 2 occurs.

In particular, according to the present embodiment, since the diameter of the brush seal 10 is smaller than that of the existing brush seal, the stress concentration due to the pressing force generated by the contact with the rotating body 2 is less generated than that of the existing brush seal having a large diameter. In this case, the breakage or the deformation of the brush seal 10 due to the stress concentration may be minimized.

In addition, the brush seal 10 according to the present embodiment may stably operate the rotating body 2 since the end part in contact with the rotating body 2 does not cause the deformation of the outer circumferential surface of the rotating body 2 due to the temperature condition due to the high temperature fluid and the friction with the rotating body 2 which is rotating.

Since the brush support portion 20 according to the present embodiment is spaced from the outer circumferential surface of the rotating body 2, the friction due to the direct contact with the rotating body 2 does not generate. Further, since the low temperature and low pressure fluid moves to the location where the brush support portion 20 is located, the occurrence of problems due to the deformation or the stress concentration is minimized.

The support portion according to the present embodiment will be described in more detail.

The assembly support portion 30 includes a first support 32 which partially contacts a side surface of the brush seal 10, a second support 34 which supports the other side of the brush support portion 20 which is an opposite side in close contact with the brush seal 10, and a third support 36 which is located between the first support 32 and the second support 34 and supports the brush seal 10 and the brush support portion 20 at the same time.

In the assembly support portion 30, the first support 32, the third support 36, and the second support 34 comes into close contact with each other from the left side along the fluid moving direction with reference to the drawing.

The first support 32 according to the present embodiment includes a first inclined surface 32a which is formed in a section in close contact with the third support 36, a brush base contacting edge 32b which extends to partially contact the brush seal 10 at an end part of the first inclined surface 32a extending toward the rotating body 2, and a first fluid space surface 32c which extends from the extending end part of the brush base contacting edge 32b toward the outside of the brush seal 10 and has the end part vertically bent toward the rotating body 2.

The first inclined surface 32a is formed to disperse the high pressure of the fluid applied to the assembly support portion 30 to the third support 36 in close contact therewith. The first inclined surface 32a may more stably support the external force due to the increase in the area in the circumferential direction of the assembly support portion 30 due to the increase in the contact area with the third support 36. The inclined angle of the first inclined surface 32a is not particularly limited, but is inclined at an angle smaller than a right angle.

Since the first inclined surface 32a is inclined toward the front of the brush seal 10, when the pressing force due to the pressure fluctuation of the fluid is applied to the inclined section, the pressing force minimally affects the brush seal 10 and is dispersed. Therefore, the pressing force of the fluid directly applied to the brush seal 10 is limited to the section in contact with the rotating body 2, and the influence on the entire radial direction is reduced, so that the occurrence of shaking or vibration may be minimized.

One side of the front surface of the brush seal 10 may be stably supported on the brush base contacting edge 32b, and the remaining section thereof is supported by the third support 36.

The first fluid space surface 32c extends toward the rotating body 2, and the extending end part thereof is not in direct contact with the rotating body 2, but maintains spacing as shown in the drawings. The fluid moves to the spacing between the rotating body 2 and the extending end part of the first fluid space surface 32c to move to the brush seal 10.

The first support 32 has the front surface provided with the first fluid guide 32d inclined toward the rotating body 2 to guide the high pressure fluid introduced into the brush seal 10 to the end part of the brush seal 10 adjacent to the rotating body 2.

The first fluid guide 32d guides the moving direction of the fluid in the arrow direction. For example, the first fluid guide 32d may guide the fluid from the radial outside of the rotating body 2 to the inside thereof. In this case, some of the fluid moves to the outer circumferential surface of the rotating body 2 and then moves to the second support 34 via the brush seal 10 and the brush support portion 20 while being mixed with the moving flow moving along the axial direction.

As described above, if the fluid passes through the brush seal 10 and the brush support portion 20 by constantly guiding the moving direction of the fluid along the axial direction of the rotating body 2, the fluid may stably move along the axial direction without being separated on the outer circumferential surface of the rotating body 2.

In addition, the moving flow of the fluid is stabilized, and as a result the problems due to the occurrence of the shaking or vibration of the brush seal 10 or the brush support portion 20 may be minimized.

A first fluid space S1 is formed between the brush seal 10 and the first support 32 facing the brush seal 10. The first fluid space S1 provides a space into which some of the fluid whose moving direction is guided through the above-described first fluid guide 32d is introduced.

The first fluid space S1 may minimize the direct impact of the high pressure fluid toward the brush seal 10 to minimize the occurrence of the shaking and vibration of the brush seal 10.

In addition, when the fluid is introduced into the first fluid space S1, some of the fluid moves toward the brush seal 10, and the remaining fluid moves to the radial outside, falls after the pressure is reduced toward the rotating body 2, and then moves along the axial direction.

The third support 36 according to the present embodiment includes a third inclined surface 36a which faces the first inclined surface 32a and contacts the first inclined surface 32a at a length corresponding to that of the first inclined surface 32a, a brush base groove 36b which is bent at the extending end part of the third inclined surface 36a toward the brush seal 10 while surrounding the outside of the brush seal 10, a brush support contacting surface 36c which extends in the axial direction of the rotating body 2 while surface-contacting the outside of the brush support portion 20 at the bent end part of the brush base groove 36b, a vertical surface 36d which extends from the extending end part of the brush support contacting surface 36c toward the radial outside of the brush support portion 20, and a fourth inclined surface 36e which is inclined in one side direction from the extending end part of the vertical surface 36d toward the radial outside.

The third support 36 is located between the first support 32 and the second support 34 and may stably seal the brush seal 10 and the brush support portion 20 at the same time under the condition that the high pressure fluid stably moves.

Since the brush base contacting edge 32b and the brush base groove 36b extends by the same length while facing each other, no spacing is present at a specific location and the state in which the brush base contacting edge 32b and the brush base groove 36b are in close contact with each other is stably maintained.

The brush support contacting surface 36c extends in the axial direction of the brush support portion 20, and when the entire length in the axial direction of the brush support portion 20 is L, the brush support contacting surface 36c surface-contacts the brush support portion 20 at a length of ⅔L or more.

When the brush support contacting surface 36c extends by the length described above, the brush support contacting surface 36c can be stably supported on the brush support portion 20, and the close contact state of the brush support contacting surface 36c with the first support 32 is also stably maintained.

The vertical surface 36d extends in the radial outside of the third support 36 by a predetermined length and the fourth inclined surface 36e whose end port is inclined toward the second support 34 to be described below extends by a predetermined length.

Even when the pressing force by the high pressure fluid is applied since the third inclined surface 36a and the vertical surface 36d in the third support 36 are not formed to be symmetrical with each other, the stress may be supported and dispersed on the first support 32 and the second support 34 which are in close contact with each other and the phenomenon that the stress concentration on the specific location occurs is minimized.

Therefore, the occurrence of unnecessary vibration may be minimized and the occurrence of noise due to the shaking may be suppressed, even under the condition that the high pressure fluid passes through the brush seal 10 and the brush support portion 20.

In addition, even the deformation of the brush seal 10 or the brush support portion 20 due to the direct or indirect friction with the rotating body 2 may be minimized, such that the occurrence of deformation may be minimized even when the brush seal 10 or the brush support portion 20 is used for a long period of time.

Since the fourth inclined surface 36e is inclined in a direction different from the third inclined surface 36a described above, when an external force is applied to the third inclined surface 36a and when the external force is applied to the fourth inclined surface 36e, respectively, a diffused direction and location of the external force become different.

In this case, it is most preferable that the external force is supported simultaneously with being diffused to adjacent components without overlapping with each other to minimize the unnecessary stress concentration, and the present embodiment can minimize the stress concentration by the above-described configuration and achieve the stable support dispersion.

The second support 34 according to the present embodiment includes a second inclined surface 34a which is partially in close contact with the third support 36 while being inclined with respect to the third support 36, a vertical edge 34b which extends from the extending end part of the second inclined surface 34a toward the brush support portion 20, a protrusion groove 34c into which the brush support portion 20 is partially inserted at the end part of the vertical edge 34b, and a second fluid space surface 34d which faces the brush support portion 20 at the protrusion groove 34c and extends toward the rotating body 2.

The second inclined surface 34a is in close contact with the fourth inclined surface 36e by a predetermined length while facing the fourth inclined surface 36e, and when the external force is applied due to the movement of the fluid, supports and diffuses the stress to the circumference in the close contact section to minimize the phenomenon that the stress is concentrated on the specific location.

When the external force is applied due to the movement of the fluid, some of the stress may be transferred in the radial direction and transferred and supported through the adjacent second inclined surface 34a and fourth inclined surface 36e or the vertical surface 36d.

The vertical edge 34b extends toward the brush support portion 20 and is in close contact with the rear surface of the third support 36 to support the external force, thereby stably supporting the brush support portion 20.

The protrusion groove 34c is formed in the axial direction of the rotating body 2 and the brush support portion 20 is in contact with and inserted into the protrusion groove 34c. A part of the brush support portion 20 extending toward the rotating body 2 is inserted into the protrusion groove 34c, so that some of the external force applied in the axial direction of the rotating body 2 may be guided to the protrusion groove 34c to be supported and dispersed. In this case, the second support 34 may concentrate the external force, which is applied to the brush support portion 20, on the upper location of the radial center based on the drawings, and minimize the phenomenon that the external force is concentrated on the location adjacent to the rotating body 2.

Therefore, the second support 34 may stably support the brush support portion 20 against the external force and minimize the phenomenon that the external force is concentrated on a specific location.

The second fluid space surface 34d extends toward the rotating body 2, but since the end parts is located while being spaced apart from each other at a predetermined interval as shown in the drawings, the fluid moves to the interval.

The second support 34 includes a second fluid guide 34e which is inclined upward from the extending end part of the second fluid space surface 34d so that the fluid passing through the brush support portion 20 passes through the second support 34 at a shortest distance to move in the axial direction of the rotating body 2 and a extending portion 34*f* which extends by a predetermined length in the axial direction of the rotating body 2 from the inclined end part of the second fluid guide 34*e*.

The second fluid guide 34*e* is configured to have an angle and a shape as shown in the drawings to improve the stability and minimize the turbulence generation due to the movement of the fluid.

The second fluid guide 34*e* guides the moving direction of the fluid in the arrow direction. For example, the second fluid guide 34*e* may guide the fluid from the radial inside of the rotating body 2 to the outside thereof. In this case, the fluid moves along the axial direction while being partially separated in the radial outside rather than being closely contacted in the axial direction of the rotating body 2.

Therefore, the fluid may stably move along the axial direction of the rotating body 2 after passing through the brush support portion 20.

As described above, when the detailed configuration of the assembly support portion 30 are shown in the drawings so that vibration and noise generated when the fluid passes through the brush seal 10 and the brush support portion 20 while moving along the axial direction of the rotating body 2 are minimized, a certain movement flow may occur along the outer circumferential surface of the rotating body 2, and thus the fluid may stably move along the axial direction without being separated.

Since the extending portion 34*f* extends longer than the length of the protrusion groove 34*c* extending in the axial direction, the fluid passing through the brush support portion 20 may stably move toward the low pressure region based on the drawings along the extending direction of the extending portion 34*f*.

A second fluid space S2 is formed between the brush support portion 20 and the second support 34 facing the brush support portion 20.

The second fluid space S2 is formed smaller than the first fluid space S1 as described above, and when the high pressure fluid moves to the second support 34 via the brush support portion 20, it is possible to achieve the stable movement by providing a fluid space depending on the movement of the fluid to the space smaller than the first fluid space S1.

The brush support portion 20 is formed of a plate which has a width W extending in the axial direction of the rotating body 2, a length L extending in the radial direction of the rotating body 2, a thickness t extending in the circumferential direction of the rotating body 2.

The brush support portion 20 is made of metallic or non-metallic materials, and the problem of shaking in the longitudinal direction is minimized even when a high pressure fluid moves. Therefore, the brush support portion 20 may maintain a constant spacing from the rotating body 2 simultaneously with stably supporting the brush seal 10, thereby improving the sealing stability.

When the high temperature fluid is supplied to the brush seal 10, if the condition in which the brush seal 10 is in contact with the rotating body 2 is maintained, the sealing safety (sealing reliability or sealing stability) is improved. In this case, the brush seal 10 may be applied to a gas turbine in which the high temperature fluid moves along the rotating body 2.

Also, the brush seal 10 may be applied to a steam turbine in which a lower temperature fluid than the high temperature fluid described above moves. The steam turbine rises to a specific temperature when the initial temperature is low and the rotating body 2 is rotated, and as a result may be used even in the condition that the brush seal 10 is not in contact with the rotating body 2. In this case, if the temperature inside the steam turbine rises, the brush seal additionally comes into contact with the rotating body.

Therefore, according to the present invention, the brush seal 10 may be used while being in contact with or being not in contact with the rotating body depending on the temperature condition of the object on which the brush seal 10 is installed.

The brush seal 10 may be configured of a multitude of brush units, or bristles, independently disposed at the same diameter, length and interval, or may have any configuration in which a plurality of brush seal units extend toward the rotating body 2. For example, when the brush seal 10 is configured of an independent brush seal unit, the brush seal 10 is disposed in plural at a predetermined interval along the circumferential direction of the casing, and the brush seal 10 is welded to the inside of the casing. In this case, when a brush seal located at a specific location is deformed or worn, the brush seal 10 according to the present embodiment is located at the corresponding location.

The above-described assembly support portion 30 is configured in any one of a semi-circular shape or a rounded shape having a specific curvature. In particular, if the assembly support portion 30 is configured in a form corresponding to the inside shape of the casing 15, an operator is easy to install and thus workability is improved.

The present embodiment can be applied to the gas turbine having a brush seal assembly in which the brush seal 10, the brush support portion 20, and the assembly support portion 30 are installed.

In the gas turbine, the high pressure fluid moves in the axial direction of the rotating body 2, and the brush seal assembly is used for sealing the same.

Referring to FIG. 6, the brush seal 10 according to the present embodiment inclinedly extends toward the rotating body 2 at a first inclination angle α1, the brush support portion 20 is inclined toward the rotating body 2 at a second inclination angle α2, and the second inclination angle α2 is larger than the first inclination angle α1.

The reason why the brush seal 10 and the brush support portion 20 are inclined is to prevent the brush seal 10 from moving to the spacing of the brush support portion 20 when the high pressure fluid moves via the brush seal 10 and the brush support portion 20.

Since the brush seal 10 is made of a flexible material, when the high pressure fluid moves to the brush support portion 20 via the brush seal 10, the brush seal 10 is bent to the location where the brush support portion 20 is located.

It is preferable that the brush seal 10 is flexibly bent in the radial direction of the rotating body 2. In this case, the brush seal 10 may flexibly be bent in the axial direction of the rotating body 2.

According to the present embodiment, the brush support portion 20 may be configured to support the brush seal 10 when the brush seal 10 is bent in the direction of the brush support portion 20, thereby minimizing the deformation occurrence and the stress concentration phenomenon of the brush seal 10.

According to the present embodiment, since the brush seal 10 and the brush support portion 20 are installed to be inclined at different inclination angles, when the brush seal 10 is bent toward the brush support portion 20, the right of the brush seal 10 is substantially in direct contact with the left of the brush support portion 20 based on the drawings and therefore the brush seal 10 moves to the spacing of the spaced brush support portion 20.

In this case, the brush seal 10 is stably supported without being excessively bent in the axial direction of the rotating body 2 due to the brush support portion 20. In addition, the high pressure fluid is adjusted to be a moving amount of a certain ratio without passing through the brush seal assembly 1 as it is.

According to the present embodiment, it is most preferable that the sealing is stably maintained by the brush seal 10 when the high pressure fluid moves via the brush seal assembly 1. In order to prevent the deformation due to the high pressure fluid, the brush seal 10 is stably supported by the brush support portion 20.

The first inclination angle $\alpha 1$ of the brush seal 10 and the second inclination angle $\alpha 2$ of the brush support portion 20 according to the present embodiment are not particularly limited. Therefore, the brush seal 10 and the brush support portion 20 are disposed to be inclined with respect to each other at the first and second inclination angles $\alpha 1$ and $\alpha 2$ of 30° or approximately 30°.

The first and second inclination angles $\alpha 1$ and $\alpha 2$ are not limited to the above-described angles when they are an angle at which the brush seal 10 does not move to the spacing of the brush support portion 20.

The brush seal 10 is configured of a multitude of brush units (i.e., bristles) having a predetermined diameter as described above, and the brush support portion 20 extends by a predetermined width in the axial direction of the rotating body 2.

As described above, according to the present invention, the brush seal 10 of the present embodiment is disposed around an outer circumferential surface of the rotating body 2 rotated inside the casing 15 and is oriented with respect to a rotating direction of the rotating body 2. The brush seal 10 has a multitude of bristles forming an angle with respect to a radial direction of the rotating body 2. A perpendicular of this radial direction is substantially parallel to a tangent of the outer circumferential surface of the rotating body 2.

Meanwhile, the brush support portion 20 is configured to support the brush seal 10 by extending toward the rotating body 2 while contacting a low-pressure side ($P_L$) of the brush seal 10, and the assembly support portion 30 is configured to support the brush seal 10 and the brush support portion 20 and to receive respectively a base end of the brush seal 10 and an axial protrusion of the brush support portion 20.

The assembly support portion 30 includes the first support 32, the second support 34, and the third support 36. The second support 34 is configured to support the brush support portion 20 from a rear side ($P_L$ side) of the brush support portion 20 opposite to the contact with the brush seal 10, and the third support 36 is disposed between the first and second supports to jointly support the brush seal 10 and the brush support portion 20. The first support 32 includes the first inclined surface 32a configured to contact and receive the third support 36; the brush base contacting edge 32b, extending from the first inclined surface 32a, configured to contact the base end of the brush seal 10 and establish the first fluid space S1 on the high-pressure side ($P_H$) of the brush seal 10; and the first fluid space surface 32c extending from the brush base contacting edge 32b toward the rotating body 2. The first support 32 has a front surface provided with the first fluid guide 32d arranged toward the rotating body 2 to guide the high-pressure fluid to a point of contact between the brush seal 20 and the rotating body 2. The second support 34 includes the second inclined surface 34a configured to contact and receive the third support 30; the vertical edge 34b extending from the second inclined surface 34a toward the brush support portion 20; the protrusion groove 34c formed adjacent to the vertical edge 34b and configured to receive the axial protrusion of the brush support portion 20; the second fluid space surface 34d, extending from the protrusion groove 34c to the rotating body 2, configured to face the brush support portion 20 and establish the second fluid space S2 on the low-pressure side ($P_L$) of the brush support portion 20; the second fluid guide 34e provided to a rear surface of the second support 34 and arranged toward the rotating body 2 to induce fluid passing through the brush support portion 20 to pass the second support 34 along a shortest path in the axial direction; and the extending portion 34f extending from the second fluid guide 34e by a predetermined distance in the axial direction, the predetermined distance being greater than a depth of the protrusion groove 34c. The protrusion groove 34c is formed in the axial direction of the rotating body 2 to receive the axial protrusion of the brush support portion 20, and the axial protrusion is inserted into the protrusion groove 34c. The third support 36 includes the third inclined surface 36a corresponding to a contact surface (32a) of the first support 32; the brush base groove 36b configured to receive the brush base, the brush base groove 36b extending from the third inclined surface 36a and having a depth corresponding to a vertical height of a surface (32b) of the first support 32 contacting the brush base; the brush support contacting surface 36c, extending from the brush base groove 36b in an axial direction of the rotating body 2, configured to receive and contact the brush support portion 20 across at least two thirds of an overall width (W') of the brush support portion 20 in the axial direction; and a lateral side (36e, 36d) corresponding to contacting surfaces (34a, 34b) of the second support 34, the lateral side comprising the fourth inclined surface 36e and the vertical surface 36d extending from the fourth inclined surface 36e to the brush support contacting surface 36c.

The first fluid space S1 is formed between the brush seal 10 and the first support 32 facing the brush seal 10. The brush support portion 20 comprises a plurality of inclined plates respectively extending toward the rotating body, and the second fluid space S2 is formed between the brush support portion 20 and the second support 34 facing the brush support portion 20.

The bristles of the brush seal 10 are substantially inclined at the first inclination angle $\alpha 1$ from the perpendicular of the radial direction. The brush support portion 20 is inclined at a second inclination angle $\alpha 2$ from the perpendicular of the radial direction. The second inclination angle $\alpha 2$ is greater than the first inclination angle $\alpha 1$. The brush seal 10 maintains contact with the outer circumferential surface of the rotating body 2, and the brush support portion 20 is spaced apart from the outer circumferential surface of the rotating body 2.

Referring to FIGS. 7 to 8, the brush seal 10 according to the present embodiment is disposed to be inclined in the rotating direction of the rotating body 2. The reason why the brush seal 10 is inclined is to prevent the brush seal 10 from being interposed into the spacing of the brush support portion 20.

Further, the brush seal 10 may be disposed in a direction different from that of FIG. 2 described above, and may have a certain gap from the rotating body 2 to achieve the stable sealing.

A brush seal assembly according to another exemplary embodiment of the present invention will be described with reference to the accompanying drawings. For reference, the present embodiment describes that the brush seal assembly is installed in the gas turbine. However, it is to be noted that the brush seal assembly may also be installed in a steam turbine or a turbo device.

Referring to FIGS. 9 to 13, a brush seal assembly 1a according to the present embodiment includes a brush seal 100 which is located to surround an outer circumferential surface of a rotor 2a (see FIG. 7) rotated inside a casing 15 of a turbine and extends to be inclined toward the rotor 2a, a brush support portion 200 which is in close contact with the brush seal 100, supports the brush seal 100, and inclinedly extends with respect to the rotor 2a, and an assembly support portion 300 which supports the brush seal 100 and the brush support portion 200, in which the brush support portion 200 extends so that a length extending toward the rotor 2a is longer than a length extending toward the brush seal 100. That is, the brush support portion 200 is configured to support the brush seal 100 by contacting the low-pressure side ($P_L$) of the brush seal 100 along a predetermined length extending toward the rotor 2a, and the predetermine length of the brush support portion 200 is greater than that of a line following a bristle of the brush seal 100.

The rotor 2a according to the present embodiment extends by a predetermined length via a center of the inside of the casing 15. The casing 15 has a hemispherical shape and thus is assembled facing each other in a vertical direction and is provided with a plurality of components along the axial direction of the rotor 2a.

The casing 15 corresponds to a hatched portion of the drawings and the brush seal assembly 1a is located as shown in the drawings. For reference, the diaphragm 4 and the bucket 6 are provided inside the casing 15.

The rotor 2a may be provided in, for example, a turbo device, but is not necessarily limited thereto.

In the present embodiment, the brush seal 100 is located having the disposition relationship shown in the drawings with respect to the rotor 2a, and the rotor 2a is rotated at a predetermined speed in the arrow direction.

In the present embodiment, the high pressure state (PH) is maintained on the left and the low pressure state (PL) is maintained on the right, with respect to the brush seal assembly 1a.

That is, when the high pressure fluid moves along the axial direction of the rotor 2a, the fluid moves through the brush seal 100 and the brush support portion 200 to minimally maintain the leakage of the fluid occurring through the gap between the brush seal assembly 1a and the rotor 2a, thereby reducing the unnecessary power loss and preventing the reduction in the energy efficiency.

The brush seal 100, the brush support portion 200, and the assembly support portion 300 may be fixed by either of a scheme for fixing end parts of the brush seal 100, the brush support portion 200, and the assembly support portion 300 to the inside of the casing or a scheme for inserting the brush seal 100, the brush support portion 200, and the assembly support portion 300 into a packing body 400 which is located inside the casing and provided with an insertion groove 410.

The packing body 400 may have any one of a semi-circular shape, a ring shape, and an arc shape having a predetermined length.

According to the present embodiment, the sealing is made by the brush seal 100 and the brush support portion 200, and the brush seal 100 and the brush support portion 200 each extend toward the rotor 2a at different angles.

For example, the brush seal 100 is disposed to be inclined in a rotating direction of the rotor 2a. The reason why the brush seal 100 is inclined is to prevent the brush seal 100 from being interposed into spacing of the brush support portion 200.

That is, a friction of the rotor 2a with the brush seal 100 occurs while the rotor 2a is rotated in the arrow direction, and the brush seal 100 is applied with a pressing force in a radial direction of the rotor 2a.

The pressing force may induce a deformation due to a continuous friction and stress concentration on the brush seal 100, and may induce the unstable sealing of the fluid passing through the brush seal assembly 1a.

According to the present embodiment, when the fluid passes through the brush seal assembly 1a, the friction and stress concentration applied to the brush seal 100 may be minimized by the brush support portion 200 to be described below, thereby preventing the deformation of the brush seal 100, more improving the sealing effect, and minimizing the unnecessary vibration.

Describing in detail this, the fluid moves the arrow direction along the axial direction of the rotor 2a, and the high pressure fluid is supplied to the brush seal 100. The brush seal 100 is held in contact with the outer circumferential surface of the rotor 2a, and when the rotor 2a is rotated in the arrow direction (clockwise), the brush seal 100 is pressed in the radial direction of the rotor 2a.

Since the brush seal 100 is made of a flexible material, when the rotor 2a is rotated under the condition that it is in contact with the rotor 2a, the brush seal 100 is bent in the radial direction and is bent toward the brush support portion 200 by the pressure of the fluid. For reference, as the flexible material, metallic or non-metallic materials which do not generate a chemical reaction with a high pressure fluid may be used.

At this time, the brush seal 100 may not be excessively bent in the radial direction of the rotor 2a and may maintain a certain gap from the rotor 2a while the brush seal 100 is in contact with the brush support portion 200.

The brush seal 100 according to the present embodiment may be configured to have any one diameter selected from 0.2 mm to 0.26 mm in diameter. Preferably, the length may be any one length selected from 20 mm to 23 mm.

According to the embodiment of the present invention, when the brush seal 100 extends by the foregoing length and diameter, the brush seal 100 may have the lower stress concentration and wear than those of the existing brush seal having a larger diameter and minimize even the irregular wear amount according to the location, as compared with the high temperature condition and the condition that the friction with the rotor 2a occurs.

In particular, according to the present embodiment, since the diameter of the brush seal 100 is smaller than that of the existing brush seal, the stress concentration due to the pressing force generated by the contact with the rotor 2a is less generated than that of the existing brush seal having a large diameter. In this case, the breakage or the deformation of the brush seal 100 due to the stress concentration may be minimized.

In addition, the brush seal 100 according to the present embodiment may stably operate the rotor 2a since the end part in contact with the rotor 2a does not cause the deformation of the outer circumferential surface of the rotor 2a due to the temperature condition due to the high temperature fluid and the friction with the rotor 2a which is rotating.

Since the brush support portion 200 according to the present embodiment is located while being spaced apart from the outer circumferential surface of the rotor 2a, the friction due to the direct contact with the rotor 2a does not occur. Further, since the low temperature and low pressure fluid moves to the location where the brush support portion 200 is located, the occurrence of problems due to the deformation or the stress concentration is minimized.

The brush seal 100 according to the present embodiment may be configured so that a diameter of an intermediate part of the brush seal 100 of the entire length extending toward from the casing to the rotor 2a increases toward the casing and the rotor 2a.

Since the brush seal 100 is kept in contact with the rotating body 2, a pressing force generated in the radial direction and a thermal expansion due to the high temperature fluid are simultaneously generated. The brush seal 100 is flexibly bent when applied with a stress in the radial direction by the rotor 2a, thereby reducing the stress concentration.

According to the present invention, the brush seal 100 is configured so that the diameter of the brush seal 100 is constant, and the diameter of the intermediate part thereof is small as described above and increases toward the casing 15 and the rotor 2a.

In this case, when the pressing force of the rotor 2a is applied to the brush seal 100, a lower end of the brush seal 100 may be kept in contact with the outer circumferential surface of the rotor 2a and more flexibly bent in the radial direction.

Therefore, the sealing stability by the brush seal 100 may be improved and the occurrence of the deformation of the brush seal 100 and the deformation of the rotor 2a can be minimized.

The brush seal 100 according to the present invention moves in the axial direction and the radial direction of the rotor 2a, and the brush support portion 200 moves only in the radial direction of the rotor 2a. In particular, the brush support portion 200 has a plate shape and therefore is bent in the radial direction.

The brush seal 100 and the brush support portion 200 according to the present embodiment are both made of a flexible material or the brush seal 100 is made of a more flexible material than the brush support portion 200. For example, the brush seal 100 and the brush support portion 200 are made of metallic or non-metallic materials, and as the brush support portion 200, a metal plate having a plate shape may be used.

The support portion according to the present embodiment will be described in more detail.

The assembly support portion 300 includes a first support 320 which partially contacts a side surface of the brush seal 100, a second support 340 which supports the other side of the brush support portion 200 which is an opposite side in close contact with the brush seal 100, and a third support 360 which is located between the first support 320 and the second support 340 and supports the brush seal 100 and the brush support portion 200 at the same time.

In the assembly support portion 300, the first support 320, the third support 360, and the second support 340 comes into close contact with each other from the left side along the fluid moving direction with reference to the drawing.

The first support 320 according to the present embodiment includes a first inclined surface 320a which is formed in a section in close contact with the third support 360, a brush base contacting edge 320b which extends to partially contact the brush seal 100 at an end part of the first inclined surface 320a extending toward the rotor 2a, and a first fluid space surface 320c which extends from the extending end part of the brush base contacting edge 320b toward the outside of the brush seal 100 and has the end part vertically bent toward the rotor 2a.

The first inclined surface 320a is formed to disperse the high pressure of the fluid applied to the assembly support portion 300 to the third support 360 in close contact therewith. The first inclined surface 320a may more stably support the external force due to the increase in the area in the circumferential direction of the assembly support portion 300 due to the increase in the contact area with the third support 360. The inclined angle of the first inclined surface 320a is not particularly limited, but is inclined at an angle smaller than a right angle.

Since the first inclined surface 320a is inclined toward the front of the brush seal 100, when the pressing force due to the pressure fluctuation of the fluid is applied to the inclined section, the pressing force minimally affects the brush seal 100 and is dispersed. Therefore, the pressing force of the fluid directly applied to the brush seal 100 is limited to the section in contact with the rotor 2a, and the influence on the entire radial direction is reduced, so that the occurrence of shaking or vibration may be minimized.

One side of the front surface of the brush seal 100 may be stably supported on the brush base contacting edge 320b, and the remaining section thereof is supported by the third support 360.

The first fluid space surface 320c extends toward the rotor 2a, and the extending end part thereof is not in direct contact with the rotor 2a, but maintains spacing as shown in the drawings. The fluid moves to the spacing between the rotor 2a and the extending end part of the first fluid space surface 320c to move to the brush seal 100.

The first support 320 has the front surface provided with the first fluid guide 320d inclined toward the rotor 2a to guide the high pressure fluid introduced into the brush seal 100 to the end part of the brush seal 100 adjacent to the rotor 2a.

The first fluid guide 320d guides the moving direction of the fluid in the arrow direction. For example, the first fluid guide 32d may guide the fluid from the radial outside of the rotor 2a to the inside thereof.

In this case, some of the fluid moves to the outer circumferential surface of the rotor 2a and then moves to the second support 340 via the brush seal 100 and the brush support portion 200 while being mixed with the moving flow moving along the axial direction.

As described above, if the fluid passes through the brush seal 100 and the brush support portion 200 by constantly guiding the moving direction of the fluid along the axial direction of the rotor 2a, the fluid may stably move along the axial direction without being separated on the outer circumferential surface of the rotor 2a.

In addition, the moving flow of the fluid is stabilized, and as a result the problems due to the occurrence of the shaking or vibration of the brush seal 100 or the brush support portion 200 may be minimized.

A first fluid space S1 is formed between the brush seal 100 and the first support 320 facing the brush seal 100. The first fluid space S1 provides a space into which some of the fluid whose moving direction is guided through the first fluid guide 320d described above is introduced, and the first fluid space S1 may minimize the direct impact of the high pressure fluid on the brush seal 100 to minimize the occurrence of the shaking and vibration of the brush seal 100.

In addition, when the fluid is introduced into the first fluid space S1, some of the fluid moves toward the brush seal 100, and the remaining fluid moves to the radial outside, falls after the pressure is reduced toward the rotor 2a, and then moves along the axial direction.

The third support 360 according to the present embodiment includes a third inclined surface 360a which faces the first inclined surface 320a and contacts the first inclined surface 320a at a length corresponding to that of the first inclined surface 320a, a brush base groove 360b which is bent at the extending end part of the third inclined surface 360a toward the brush seal 100 while surrounding the outside of the brush seal 100, a brush support contacting surface 360c which extends in the axial direction of the rotor 2a while surface-contacting the outside of the brush support portion 200 at the bent end part of the brush base groove 360b, a vertical surface 360d which extends from the extending end part of the brush support contacting surface 360c toward the radial outside of the brush support portion 200, and a fourth inclined surface 360e which is inclined in one side direction from the extending end part of the vertical surface 360d toward the radial outside.

The third support 360 is located between the first support 320 and the second support 340 and may stably seal the brush seal 100 and the brush support portion 200 at the same time under the condition that the high pressure fluid stably moves.

Since the brush base contacting edge 320b and the brush base groove 360b extends by the same length while facing each other, no spacing is present at a specific location and the state in which the brush base contacting edge 320b and the brush base groove 360b are in close contact with each other is stably maintained.

The brush support contacting surface 360c extends in the axial direction of the brush support portion 200, and when the entire length in the axial direction of the brush support portion 200 is L, the brush support contacting surface 360c surface-contacts the brush support portion 200 at a length of ⅔L or more.

When the brush support contacting surface 360c extends by the length described above, the brush support contacting surface 360c can be stably supported on the brush support portion 200, and the close contact state of the brush support contacting surface 360c with the first support 320 is also stably maintained.

The vertical surface 360d extends in the radial outside of the third support 360 by a predetermined length and the fourth inclined surface 360e whose end port is inclined toward the second support 340 to be described below extends by a predetermined length.

Even when the pressing force by the high pressure fluid is applied since the third inclined surface 360a and the vertical surface 360d in the third support 360 are not formed to be symmetrical with each other, the stress may be supported and dispersed on the first support 320 and the second support 340 which are in close contact with each other and the phenomenon that the stress concentration on the specific location occurs is minimized.

Therefore, the occurrence of unnecessary vibration may be minimized and the occurrence of noise due to the shaking may be suppressed, even under the condition that the high pressure fluid passes through the brush seal 100 and the brush support portion 200.

In addition, even the deformation of the brush seal 100 or the brush support portion 200 due to the direct or indirect friction with the rotor 2a may be minimized, such that the occurrence of deformation may be minimized even when the brush seal 100 or the brush support portion 200 is used for a long period of time.

Since the fourth inclined surface 360e is inclined in a direction different from the third inclined surface 360a described above, when an external force is applied to the third inclined surface 360a and when the external force is applied to the fourth inclined surface 360e, respectively, a diffused direction and location of the external force become different.

In this case, it is most preferable that the external force is supported simultaneously with being diffused to adjacent components without overlapping with each other to minimize the unnecessary stress concentration, and the present embodiment can minimize the stress concentration by the above-described configuration and achieve the stable support dispersion.

The second support 340 according to the present embodiment includes a second inclined surface 340a which is partially in close contact with third support 360 while being inclined with respect to the third support 360, a vertical edge 340b which extends from the extending end part of the second inclined surface 340a toward the brush support portion 200, a protrusion groove 340c into which the brush support portion 200 is partially inserted at the end part of the vertical edge 340b, and a second fluid space surface 340d which faces the brush support portion 200 at the protrusion groove 340c and extends toward the rotor 2a.

The second inclined surface 340a is in close contact with the fourth inclined surface 360e by a predetermined length while facing the fourth inclined surface 360e, and when the external force is applied due to the movement of the fluid, supports and diffuses the stress to the circumference in the close contact section to minimize the phenomenon that the stress is concentrated on the specific location.

When the external force is applied due to the movement of the fluid, some of the stress may be transferred in the radial direction and transferred and supported through the adjacent second inclined surface 340a and fourth inclined surface 360e or the vertical surface 360d.

The vertical edge 340b extends toward the brush support portion 200 and is in close contact with the rear surface of the third support 360 to support the external force, thereby stably supporting the brush support portion 200.

The protrusion groove 340c is formed in the axial direction of the rotor 2a and the brush support portion 200 is in contact with and inserted into the protrusion groove 340c. A part of the brush support portion 200 extending toward the rotor 2a is inserted into the protrusion groove 340c, so that some of the external force applied in the axial direction of the rotor 2a may be guided to the protrusion groove 340c to be supported and dispersed.

In this case, the second support 340 may concentrate the external force, which is applied to the brush support portion 200, on the upper location of the radial center based on the drawings, and minimize the phenomenon that the external force is concentrated on the location adjacent to the rotor 2a.

Therefore, the second support 340 may stably support the brush support portion 200 against the external force and minimize the phenomenon that the external force is concentrated on a specific location.

The second fluid space surface 340d extends toward the rotor 2a, but since the end parts is located while being spaced apart from each other at a predetermined interval as shown in the drawings, the fluid moves to the interval.

The second support 340 includes a second fluid guide 340e which is inclined upward from the extending end part of the second fluid space surface 340d so that the fluid passing through the brush support portion 200 passes through the second support 340 at a shortest distance to move in the axial direction of the rotor 2a and a extending portion 340f which extends by a predetermined length in the axial direction of the rotor 2a from the inclined end part of the second fluid guide 340e.

The second fluid guide 340e is configured to have an angle and a shape as shown in the drawings to improve the stability and minimize the turbulence generation due to the movement of the fluid.

The second fluid guide 340e guides the moving direction of the fluid in the arrow direction. For example, the second fluid guide 340e may guide the fluid from the radial inside of the rotor 2a to the outside thereof. In this case, the fluid moves along the axial direction while being partially separated in the radial outside rather than being closely contacted in the axial direction of the rotor 2a.

Therefore, the fluid may stably move along the axial direction of the rotor 2a after passing through the brush support portion 200.

As described above, when the detailed configuration of the assembly support portion 300 are shown in the drawings so that vibration and noise generated when the fluid passes through the brush seal 100 and the brush support portion 200 while moving along the axial direction of the rotor 2a are minimized, a certain movement flow may occur along the outer circumferential surface of the rotor 2a, and thus the fluid may stably move along the axial direction without being separated.

Since the extending portion 340f extends longer than the length of the protrusion groove 340c extending in the axial direction, the fluid passing through the brush support portion 200 may stably move toward the low pressure region based on the drawings along the extending direction of the extending portion 340f.

A second fluid space S2 is formed between the brush support portion 200 and the second support 340 facing the brush support portion 200.

The second fluid space S2 is formed smaller than the first fluid space S1 as described above, and when the high pressure fluid moves to the second support 340 via the brush support portion 200, it is possible to achieve the stable movement by providing a fluid space depending on the movement of the fluid to the space smaller than the first fluid space S1.

The brush support portion 200 is formed of a plate which has a width W extending in the axial direction of the rotor 2a, a length L extending in the radial direction of the rotor 2a, a thickness t extending in the circumferential direction of the rotor 2a.

The brush support portion 200 is made of metallic or non-metallic materials, and the problem of shaking in the longitudinal direction is minimized even when a high pressure fluid moves.

Therefore, the brush support portion 200 may maintain a constant spacing from the rotor 2a simultaneously with stably supporting the brush seal 100, thereby improving the sealing stability.

When the high temperature fluid is supplied to the brush seal 100, if the condition in which the brush seal 100 is in contact with the rotor 2a is maintained, the sealing safety is improved. In this case, the brush seal 100 may be applied to a gas turbine in which the high temperature fluid moves along the rotor 2a.

Also, the brush seal 100 may be applied to a steam turbine in which a lower temperature fluid than the high temperature fluid described above moves. The steam turbine rises to a specific temperature when the initial temperature is low and the rotor 2a is rotated, and as a result may be used even in the condition that the brush seal 100 is not in contact with the rotor 2a. In this case, if the temperature inside the steam turbine rises, the brush seal additionally comes into contact with the rotating body.

Therefore, according to the present invention, the brush seal 100 may be used while being in contact with or being not in contact with the rotating body depending on the temperature condition of the object on which the brush seal 100 is installed.

The brush seal 100 may be configured of a multitude of brush units, or bristles, independently disposed at the same diameter, length and interval, or may have any configuration in which a plurality of brush seal units extend toward the rotor 2a. For example, when the brush seal 100 is configured of an independent brush seal unit, the brush seal 100 is disposed in plural at a predetermined interval along the circumferential direction of the casing, and the brush seal 100 is welded to the inside of the casing. In this case, when a brush seal located at a specific location is deformed or worn, the brush seal 100 according to the present embodiment is located at the corresponding location.

The above-described assembly support portion 300 is configured in any one of a semi-circular shape or a rounded shape having a specific curvature. In particular, if the assembly support portion 300 is configured in a form corresponding to the inside shape of the casing 15, an operator is easy to install and thus workability is improved.

The present embodiment can be applied to the gas turbine having a brush seal assembly in which the brush seal 100, the brush support portion 200, and the assembly support portion 300 are installed.

In the gas turbine, the high pressure fluid moves in the axial direction of the rotor 2a, and the brush seal assembly is used for sealing the same.

The above-described assembly support portion 300 is configured in any one of a semi-circular shape or a rounded shape having a specific curvature. In particular, if the assembly support portion 300 is configured in a form corresponding to the inside shape of the casing, an operator is easy to install and thus workability is improved.

The brush seal 100 according to the present embodiment inclinedly extends toward the rotor 2a at a first inclination angle α1, the brush support portion 200 is inclined toward the rotor 2a at a second inclination angle α2, and the second inclination angle α2 is larger than the first inclination angle α1.

The reason why the brush seal 100 and the brush support portion 200 are inclined is to prevent the brush seal 100 from moving to the spacing of the brush support portion 200 when the high pressure fluid moves via the brush seal 100 and the brush support portion 200.

Since the brush seal 100 is made of a flexible material, when the high pressure fluid moves to the brush support portion 200 via the brush seal 100, the brush seal 100 is bent to the location where the brush support portion 200 is located.

It is preferable that the brush seal 100 is flexibly bent in the radial direction of the rotor 2a. In this case, the brush seal 100 may flexibly be bent in the axial direction of the rotor 2a.

According to the present embodiment, the brush support portion 200 may be configured to support the brush seal 100 when the brush seal 100 is bent in the direction of the brush support portion 200, thereby minimizing the deformation occurrence and the stress concentration phenomenon of the brush seal 100.

According to the present embodiment, since the brush seal 100 and the brush support portion 200 are installed to be inclined at different inclination angles, when the brush seal 100 is bent toward the brush support portion 200, the right of the brush seal 100 is substantially in direct contact with the left of the brush support portion 200 based on the drawings and therefore the brush seal 100 moves to the spacing of the spaced brush support portion 200.

In this case, the brush seal 100 is stably supported without being excessively bent in the axial direction of the rotor 2a due to the brush support portion 200. In addition, the high pressure fluid is adjusted to be a moving amount of a certain ratio without passing through the brush seal assembly 1a as it is.

According to the present embodiment, it is most preferable that the sealing is stably maintained by the brush seal 100 when the high pressure fluid moves via the brush seal assembly 1a. In order to prevent the deformation due to the high pressure fluid, the brush seal 100 is stably supported by the brush support portion 200.

The first inclination angle α1 of the brush seal 100 and the second inclination angle α2 of the brush support portion 200 according to the present embodiment are not particularly limited. Therefore, the brush seal 100 and the brush support portion 200 are disposed to be inclined with respect to each other at the first and second inclination angles α1 and α2 of 30° or approximately 30°.

The first and second inclination angles α1 and α2 are not limited to the above-described angles when they are an angle at which the brush seal 100 does not move to the spacing of the brush support portion 200.

The brush seal 100 is configured of bristles having a predetermined diameter as described above, and the brush support portion 200 extends by a predetermined width in the axial direction of the rotor 2a.

The brush support portion 200 is formed of a plate which has a width W extending in the axial direction of the rotor 2a, a length L extending in the radial direction of the rotor 2a, a thickness t extending in the circumferential direction of the rotor 2a.

The brush support portion 200 is made of metallic or non-metallic materials, and the problem of shaking in the longitudinal direction is minimized even when a high pressure fluid moves. Therefore, the brush support portion 200 may maintain a constant spacing from the rotor 2a simultaneously with stably supporting the brush seal 100, thereby improving the sealing stability.

The brush seal 100 is configured so that the number of brush seals 100 is larger than that of the brush support portion 200. Since the brush seal 100 is provided for sealing the high pressure fluid, the number of brush seals 100 is smaller than that of the brush support portion 200 provided for supporting the brush seal 100.

When the high temperature fluid is supplied to the brush seal 100, if the condition in which the brush seal 100 is in contact with the rotor 2a is maintained, the sealing safety is improved. In this case, the brush seal 100 may be applied to a gas turbine in which the high temperature fluid moves along the rotor 2a.

Also, the brush seal 100 may be applied to a steam turbine in which a lower temperature fluid than the high temperature fluid described above moves. The steam turbine rises to a specific temperature when the initial temperature is low and the rotor 2a is rotated, and as a result may be used even in the condition that the brush seal 100 is not in contact with the rotor 2a. In this case, if the temperature inside the steam turbine rises, the brush seal additionally comes into contact with the rotor. Therefore, according to the present invention, the brush seal 100 may be used while being in contact with or being not in contact with the rotor depending on the temperature condition of the object on which the brush seal 100 is installed.

The brush support portion 200 is made of a material having a different thermal expansion rate in the radial direction of the rotor 2a. For example, the brush support portion 200 may include a first brush support 210 which extends by a first length L1 from the third support 360 toward the rotor 2a and has a first thermal expansion rate and a second brush support 220 which extends at a second length L2 toward the outer circumferential surface of the rotor 2a up to the end part of the first brush support 210 extending toward the rotor 2a and has a second thermal expansion rate.

The second brush support 220 has a thermal expansion rate smaller than that of the first brush support 210. The second brush support 220 has a minimum thermal expansion rate in a section where it extends toward the rotor 2a to maintain a certain interval from the outer circumferential surface of the rotor 2a. In other words, the brush support portion 200 may be made of a material having a different thermal expansion rate according to a distance from the rotor along the radial direction.

Therefore, the brush support portion 200 is stably maintained by the second brush support 220 for the sealing of the fluid, and the thermal expansion due to the high temperature fluid is made in the radial direction of the rotor 2a by the first brush support 210.

The brush support portion 200 extends while having a thickness reduced from the casing 15 toward the rotor 2a. In other words, the brush support portion 200 has a different thickness according to a distance from the rotor 2a along the radial direction. The brush support portion 200 serves to support the brush seal 100 when the brush seal 100 is bent in the direction in which the brush support portion 200 is located by the pressure of the fluid and should not be shaken or vibrated due to the fluid.

The fluid moving in the axial direction of the rotor 2a moves toward the brush seal 100 and the brush support portion 200 by the high pressure, and therefore the brush support portion 200 is also applied with the pressing force in the axial direction and the radial direction of the rotor 2a.

As described above, when the brush support portion 200 may be formed to have the same thickness toward the rotor 2a or the thickness of the brush support portion 200 is constantly reduced toward the rotor 2a, the problem that the whole of the brush support portion 200 is shaken is minimized or little occurs, such that the unnecessary vibration noise does not occur.

The gas turbine provided with the brush seal 100, the brush support portion 200, and the assembly support portion 300 according to the present embodiment is provided, and when the gas turbine includes the above-described components, the deformation of the brush seal 100 due to the high pressure fluid may be prevented.

In addition, it is possible to improve the durability of the gas turbine and increase the power generation efficiency by preventing the deformation of the rotor 2a and preventing the shaking of the brush support portion 200. In addition, it is possible to minimize the loss of the heat energy of the high pressure fluid.

According to the embodiments of the present invention, deformation of the brush seal contacting the rotating body or the rotor can be minimal, even when it is continuously exposed to heat and abrasion, thereby improving the durability and promoting the stable sealing.

According to the embodiments of the present invention, the brush support portion can stably support the brush seal in contact with the rotor even when the brush seal is bent due to the high pressure fluid, thereby minimizing the damage or deformation of the brush seal.

According to the embodiments of the present invention, the brush seal can prevent the occurrence of the local traces or sticking on the outer side of the rotor to minimize the occurrence of vibration of the rotor due to no local traces or sticking on the outside of the rotor, thereby improving the efficiency of the gas turbine.

What is claimed is:

1. A brush seal assembly, comprising:
   a brush seal disposed around an outer circumferential surface of a rotating body rotated inside a casing and oriented with respect to a rotating direction of the rotating body, the brush seal having a multitude of bristles forming an angle with respect to a radial direction of the rotating body;
   a brush support portion configured to support the brush seal by extending toward the rotating body while contacting a low-pressure side of the brush seal; and
   an assembly support portion configured to support the brush seal and the brush support portion and to receive respectively a base end of the brush seal and an axial protrusion of the brush support portion,
   wherein the assembly support portion includes:
   a first support including a first inclined surface configured to contact and receive the third support, a brush base contacting edge, extending from the first inclined surface, configured to contact the base end of the brush seal and establish a first fluid space on a high-pressure side of the brush seal, and a first fluid space surface extending from the brush base contacting edge toward the rotating body;
   a second support configured to support the brush support portion from a rear side of the brush support portion opposite to the contact with the brush seal; and
   a third support disposed between the first and second supports to jointly support the brush seal and the brush support portion.

2. The brush seal assembly of claim 1, wherein the first support has a front surface provided with a first fluid guide arranged toward the rotating body to guide a high-pressure fluid to a point of contact between the brush seal and the rotating body.

3. The brush seal assembly of claim 1, wherein the second support includes:
   a second inclined surface configured to contact and receive the third support;
   a vertical edge extending from the second inclined surface toward the brush support portion;
   a protrusion groove formed adjacent to the vertical edge and configured to receive the axial protrusion of the brush support portion; and
   a second fluid space surface, extending from the protrusion groove to the rotating body, configured to face the brush support portion and establish a second fluid space on a low-pressure side of the brush support portion.

4. The brush seal assembly of claim 3, wherein the second support further includes:
   a second fluid guide provided to a rear surface of the second support and arranged toward the rotating body to induce fluid passing through the brush support portion to pass the second support along a shortest path in the axial direction; and
   an extending portion extending from the second fluid guide by a predetermined distance in the axial direction, the predetermined distance being greater than a depth of the protrusion groove.

5. The brush seal assembly of claim 3, wherein the protrusion groove is formed in the axial direction of the rotating body to receive the axial protrusion of the brush support portion, and wherein the axial protrusion is inserted into the protrusion groove.

6. The brush seal assembly of claim 1, wherein the third support includes:
   a third inclined surface corresponding to a contact surface of the first support;
   a brush base groove configured to receive the brush base, the brush base groove extending from the third inclined surface and having a depth corresponding to a vertical height of a surface of the first support contacting the brush base; and
   a brush support contacting surface, extending from the brush base groove in an axial direction of the rotating body, configured to receive and contact the brush support portion across at least two thirds of an overall width of the brush support portion in the axial direction.

7. The brush seal assembly of claim 6, wherein the third support further includes a lateral side corresponding to contacting surfaces of the second support, the lateral side comprising:
   a fourth inclined surface; and
   a vertical surface extending from the fourth inclined surface to the brush support contacting surface.

8. The brush seal assembly of claim 1, wherein a first fluid space is formed between the brush seal and the first support facing the brush seal, and
   wherein the brush support portion comprises a plurality of inclined plates respectively extending toward the rotating body, and a second fluid space is formed between the brush support portion and the second support facing the brush support portion.

9. The brush seal assembly of claim 1, wherein the bristles of the brush seal are substantially inclined at a first inclination angle $\alpha1$ from perpendicular to the radial direction, the brush support portion is inclined at a second inclination angle $\alpha2$ from perpendicular to the radial direction, and the second inclination angle $\alpha2$ is greater than the first inclination angle $\alpha1$, and
   wherein the brush seal maintains contact with the outer circumferential surface of the rotating body, and the brush support portion is spaced apart from the outer circumferential surface of the rotating body.

10. A brush seal assembly, comprising:
    a brush seal disposed around an outer circumferential surface of a rotor rotated inside a casing of a turbine and oriented with respect to a rotating direction of the rotor, the brush seal having a multitude of bristles forming an angle with respect to a radial direction of the rotor;
    a brush support portion configured to support the brush seal by contacting a low-pressure side of the brush seal along a predetermined length extending toward the rotor; and
    an assembly support portion configured to support the brush seal and the brush support portion,
    wherein the predetermine length of the brush support portion is greater than that of a line following a bristle of the brush seal, and wherein the assembly support portion includes:
  a first support including a first inclined surface configured to contact and receive the third support, a brush base contacting edge, extending from the first inclined surface, configured to contact the base end of the brush seal and establish a first fluid space on a high-pressure side of the brush seal, and a first fluid space surface extending from the brush base contacting edge toward the rotating body;
  a second support configured to support the brush support portion from a rear side of the brush support portion opposite to the contact with the brush seal; and
  a third support disposed between the first and second supports to jointly support the brush seal and the brush support portion.

11. The brush seal assembly of claim 10, wherein a first fluid space is formed between the brush seal and a first surface of the assembly support portion facing the brush seal, and a second fluid space is formed between the brush support portion and a second surface of the assembly support portion facing the brush support portion.

12. The brush seal assembly of claim 10, wherein the brush support portion comprises a plurality of inclined plates of the predetermined length extending toward the rotating body.

13. The brush seal assembly of claim 12, wherein the bristles of the brush seal are substantially inclined at a first inclination angle $\alpha 1$ from perpendicular to the radial direction, the inclined plates of the brush support portion are respectively inclined at a second inclination angle $\alpha 2$ from perpendicular to the radial direction, and the second inclination angle $\alpha 2$ is greater than the first inclination angle $\alpha 1$.

14. The brush seal assembly of claim 10, wherein the brush support portion is made of a material having a different thermal expansion rate in the radial direction of the rotor.

15. The brush seal assembly of claim 10, wherein the brush support portion has a different thickness in the radial direction of the rotor.

16. The brush seal assembly of claim 10, wherein the brush support portion has a thickness which is smaller, from the casing toward the rotor.

17. The brush seal assembly of claim 10, wherein the brush support portion includes:
  a first brush support extending from the assembly support portion toward the rotor, the first brush support having a first length and a first thermal expansion rate; and
  a second brush support extending from the first brush support toward the rotor, the second brush support having a second length and a second thermal expansion rate less than the first thermal expansion rate.

18. The brush seal assembly of claim 10, wherein the assembly support portion is configured to receive respectively a base end of the brush seal and an axial protrusion of the brush support portion.

* * * * *